US012798179B2

(12) United States Patent
Takimoto et al.

(10) Patent No.: US 12,798,179 B2
(45) Date of Patent: Nov. 17, 2026

(54) LIQUID FABRICATION, FABRICATION KIT, AND METHOD OF MANUFACTURING FABRICATION OBJECT

(71) Applicants: Koji Takimoto, Kanagawa (JP); Shinichiroh Satoh, Tokyo (JP); Keisuke Shiba, Bremen (DE); Yuki Shingai, Kanagawa (JP); Noriaki Okada, Kanagawa (JP); Yuji Nagatomo, Kanagawa (JP); Tomoki Kai, Kanagawa (JP); Hisataka Takagi, Shropshire (GB); Yoichi Ito, Tokyo (JP); Tsuyoshi Arao, Kanagawa (JP); Takashi Matsumura, Kanagawa (JP); Tomomi Akieda, Kanagawa (JP)

(72) Inventors: Koji Takimoto, Kanagawa (JP); Shinichiroh Satoh, Tokyo (JP); Keisuke Shiba, Bremen (DE); Yuki Shingai, Kanagawa (JP); Noriaki Okada, Kanagawa (JP); Yuji Nagatomo, Kanagawa (JP); Tomoki Kai, Kanagawa (JP); Hisataka Takagi, Shropshire (GB); Yoichi Ito, Tokyo (JP); Tsuyoshi Arao, Kanagawa (JP); Takashi Matsumura, Kanagawa (JP); Tomomi Akieda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 785 days.

(21) Appl. No.: 18/149,368

(22) Filed: Jan. 3, 2023

(65) Prior Publication Data

US 2023/0211550 A1 Jul. 6, 2023

(30) Foreign Application Priority Data

Jan. 6, 2022 (JP) ................................ 2022-000920
Mar. 10, 2022 (JP) ................................ 2022-036965

(51) Int. Cl.
*B29C 64/165* (2017.01)
*B29C 64/209* (2017.01)
(Continued)

(52) U.S. Cl.
CPC .......... *B29C 64/165* (2017.08); *B29C 64/209* (2017.08); *B29K 2031/04* (2013.01);
(Continued)

(58) Field of Classification Search
CPC ..... B29C 64/165; B29C 64/209; B33Y 10/00; B33Y 30/00; B33Y 70/10; B29K 2031/04; B29K 2305/02
See application file for complete search history.

(56) References Cited

U.S. PATENT DOCUMENTS 5,902,441 A 5/1999 Bredt et al.
2005/0225007 A1* 10/2005 Lai .................... G05B 19/4099 425/375
(Continued)

FOREIGN PATENT DOCUMENTS

CN 112172140 A 1/2021
CN 113426993 A 9/2021
(Continued)

OTHER PUBLICATIONS

Edward W. Washburn, The Dynamics of Capillary Flow, Mar. 1921, The Physical Review, vol. XVIII, No. 3, 273-283 (Year: 1921).*
(Continued)

*Primary Examiner* — Galen H Hauth
*Assistant Examiner* — John Robitaille
(74) *Attorney, Agent, or Firm* — Grüneberg Global IP, PLLC

(57) ABSTRACT

A liquid fabrication applied to a layer of powder containing an inorganic particle, wherein the liquid fabrication has a powder contact angle with the inorganic particle of 50
(Continued)

degrees or greater and satisfies the following relationship 1: $\gamma\cos\theta/\eta \leq 1.5$ m/s, where θ represents the powder contact angle, γ represents a surface tension in mN/m of the liquid fabrication at 23 degrees C., and η represents a viscosity in mPa·s of the liquid fabrication at 25 degrees C.

17 Claims, 9 Drawing Sheets

(51) Int. Cl.

| | |
|---|---|
| ***B33Y 10/00*** | (2015.01) |
| *B29K 31/00* | (2006.01) |
| *B29K 305/02* | (2006.01) |
| *B33Y 30/00* | (2015.01) |
| *B33Y 70/10* | (2020.01) |

(52) U.S. Cl.

CPC ........... *B29K 2305/02* (2013.01); *B33Y 10/00* (2014.12); *B33Y 30/00* (2014.12); *B33Y 70/10* (2020.01)

(56) References Cited

U.S. PATENT DOCUMENTS

| | | | | |
|---|---|---|---|---|
| 2006/0061618 | A1* | 3/2006 | Hernandez ............. | B33Y 40/00 347/29 |
| 2016/0040025 | A1 | 2/2016 | Norikane et al. | |
| 2016/0160021 | A1 | 6/2016 | Kojima et al. | |
| 2016/0214320 | A1 | 7/2016 | Sasaki et al. | |
| 2016/0243805 | A1 | 8/2016 | Satoh | |
| 2017/0120521 | A1 | 5/2017 | Sakura et al. | |
| 2017/0146925 | A1 | 5/2017 | Tsuji et al. | |
| 2017/0176886 | A1 | 6/2017 | Nagatomo et al. | |
| 2017/0259456 | A1 | 9/2017 | Sasaki et al. | |
| 2017/0327701 | A1* | 11/2017 | Connor ................. | B22F 3/1017 |
| 2018/0061279 | A1 | 3/2018 | Niimi et al. | |
| 2018/0071820 | A1* | 3/2018 | Natarajan .............. | B33Y 10/00 |
| 2018/0126651 | A1 | 5/2018 | Matsumura et al. | |
| 2018/0178447 | A1* | 6/2018 | Abbott, Jr. .............. | B22F 10/28 |
| 2020/0010580 | A1* | 1/2020 | Shimada ................. | B29C 64/40 |
| 2020/0114577 | A1 | 4/2020 | Satoh | |
| 2020/0115579 | A1 | 4/2020 | Kido et al. | |
| 2020/0290270 | A1 | 9/2020 | Akira et al. | |
| 2020/0298476 | A1 | 9/2020 | Saito et al. | |
| 2021/0001543 | A1 | 1/2021 | Sogame et al. | |
| 2021/0268728 | A1 | 9/2021 | Saito et al. | |
| 2021/0292511 | A1 | 9/2021 | Satoh | |
| 2021/0299953 | A1 | 9/2021 | Nagatomo et al. | |
| 2022/0032379 | A1 | 2/2022 | Yamashita et al. | |
| 2022/0112329 | A1 | 4/2022 | Satoh et al. | |
| 2022/0282080 | A1 | 9/2022 | Shingai et al. | |
| 2022/0305557 | A1 | 9/2022 | Satoh et al. | |
| 2022/0306880 | A1 | 9/2022 | Yuki et al. | |
| 2022/0388069 | A1 | 12/2022 | Kai et al. | |

FOREIGN PATENT DOCUMENTS

| | | | |
|---|---|---|---|
| JP | 8-52934 | A | 2/1996 |
| JP | 3607300 | | 10/2004 |
| JP | 2016-037041 | | 3/2016 |
| JP | 2016-107465 | | 6/2016 |
| JP | 2016-137697 | | 8/2016 |
| JP | 2018-154074 | | 10/2018 |
| JP | 2019-31106 | A | 2/2019 |
| JP | 2020-505512 | | 2/2020 |
| JP | 2022-135572 | | 9/2022 |
| JP | 2022-185646 | | 12/2022 |
| WO | WO2018/199995 | A1 | 11/2018 |
| WO | 2021/193339 | A1 | 9/2021 |

OTHER PUBLICATIONS

M. Denesuk et al, Capillary Penetration of Liquid Droplets into Porous Materials, Journal of Colloid and Interface Science, vol. 158, Issue 1, Jun. 1993, pp. 114-120 (Year: 1993).*

Markus Hilpert et al., Infiltration of liquid droplets into porous media: Effects of dynamic contact angle and contact angle hysteresis, International Journal of Multiphase Flow, vol. 35, Issue 3, Mar. 2009, pp. 205-218 (Year: 2009).*

Solgang Im, Binder Development for Binder Jetting of Aluminum Powder, 2021, University of Waterloo (Year: 2021).*

Rachid Chebbi, Absorption and Spreading of a Liquid Droplet Over a Thick Porous Substrate, ACS Omega 2021, 6, 4649-4655 (Year: 2021).*

M. Denesuk et al, Capillary Penetration of Liquid Droplets into Porous Materials, Journal of Colloid and Interface Science, vol. 158, Issue 1, Jun. 1993, pp. 114-120 (Year: 1993) (Year: 1993).*

Extended European Search Report dated May 23, 2023, in European Application No. 23150449.9, 12 pages.

Mostafaei Amir et al., Binder jet 3D printing—Process parameters, materials, properties, modeling, and challenges, Progress in Materials Science, vol. 119, 100707, 2021, pp. 1-138.

Tang Yang, et al. "Enhancing the Capillary Fore of Binder-Jetting Printing Ti6A14V and Mechanical Properties under High Temperature Sintering by Mixing Fine Powder", Metals, vol. 10,1354, 2020, pp. 1-16.

Communication issued in Chinese Patent Application No. 202310015651.7, issued on Jan. 9, 2026, 4 pages.

Japanese Office Action issued in Japanese Patent Application No. 2022-036965 on Oct. 7, 2025, 4 pages.

Communication issued in Chinese Patent Application No. 202310015651.7, issued Jul. 1, 2025, 16 pages, with English translation.

* cited by examiner

LIQUID FABRICATION, FABRICATION KIT, AND METHOD OF MANUFACTURING FABRICATION OBJECT

CROSS-REFERENCE TO RELATED APPLICATIONS

This patent application is based on and claims priority pursuant to 35 U.S.C. § 119 to Japanese Patent Application Nos. 2022-000920 and 2022-036965, filed on Jan. 6, 2022 and Mar. 10, 2022, respectively, in the Japan Patent Office, the entire disclosures of which are hereby incorporated by reference herein.

BACKGROUND

Technical Field

The present disclosure relates to a liquid fabrication, a fabrication kit, and a method of manufacturing a fabrication object.

Description of the Related Art

There is an increasing demand for producing fine and complicated fabrication objects made of a substance such as metal. As a technology for meeting this need, there is a method of sintering a sintering precursor fabricated by binder jetting (BJ) method using powder metallurgy, thereby manufacturing a densified object with a high production efficiency.

Since a water-based liquid fabrication is generally used in the BJ method, using powder containing particles of metal such as aluminum or magnesium which is likely to react with water is unfavorable in this method. For this reason, the chance of using an organic solvent-based liquid fabrication with such metal particles likely to react with water has been investigated. However, generally, organic solvent-based liquid fabrication has higher wettability to the surface of a metal particle than water-based liquid fabrication, which results in manufacturing a fabrication object outside a target dimensional accuracy.

SUMMARY

According to embodiments of the present disclosure, a liquid fabrication is provided which is applied to a layer of powder containing an inorganic particle, wherein the liquid fabrication has a powder contact angle with the inorganic particle of 50 degrees or greater and satisfies the following relationship 1: $\gamma\cos\theta/\eta \leq 1.5$ m/s, where $\theta$ represents the powder contact angle, $\gamma$ represents a surface tension in mN/m of the liquid fabrication at 23° C., and $\eta$ represents a viscosity in mPa·s of the liquid fabrication at 25° C.

As another aspect of embodiments of the present disclosure, a liquid fabrication is provided which contains an organic solvent, a surfactant, and a resin having a structural unit represented by the following Chemical Formula 1, wherein the liquid fabrication is applied to a layer of powder containing inorganic particles, Chemical Formula 1

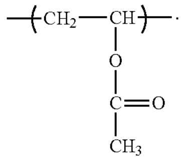

As another aspect of embodiments of the present disclosure, a fabrication kit is provided which contains the liquid fabrication mentioned above and an inorganic particle.

As another aspect of embodiments of the present disclosure, a method of manufacturing a fabrication object is provided which includes forming a layer of powder containing an inorganic particle, applying the described liquid fabrication to the layer, and sequentially repeating the forming and the applying to form a laminate.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1A:
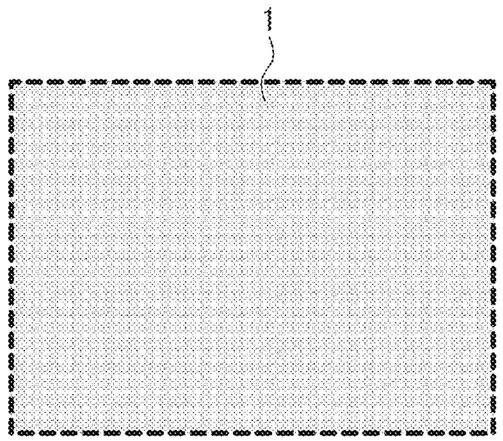
FIG. 1A is a schematic diagram illustrating a state of fabrication having a target dimensional accuracy.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a liquid fabrication has been provided with which a fabrication object can be manufactured with an excellent dimensional accuracy.

Liquid Fabrication

The liquid fabrication of the present disclosure is applied to a layer of powder containing inorganic particles, wherein the liquid fabrication has a powder contact angle with the inorganic particles of 50 degrees or greater and satisfies the following relationship 1: $\gamma\cos\theta/\eta\leq1.5$ m/s.

n the relationship 1, $\theta$ represents the powder contact angle, $\gamma$ represents the surface tension in mN/m of the liquid fabrication at 23° C., and $\eta$ represents a viscosity in mPa·s of the liquid fabrication at 25° C.

To measure the powder contact angle (hereinafter also referred to as powder contact angle $\theta$) between a liquid fabrication and an inorganic particle, the inorganic particle is used as it is when the type of the inorganic particle for use in fabrication is identified. An aluminum particle is used if the type of the inorganic particle for use in fabrication is unidentified. Therefore, if the type of an inorganic particle for use in fabrication is not identified but the type of a liquid fabrication is identified, an aluminum particle can be used as the inorganic particle to obtain the powder contact angle $\theta$ and whether $\gamma\cos\theta/\eta\leq1.5$ is satisfied. One of such aluminum particles is ALSI3-30B, manufactured by Toyo Aluminium K.K.

When an organic solvent-based liquid fabrication is used in a typical method of coating metal particles with resin and another typical method of adding organic particles to a liquid fabrication, the vapor of the organic solvent produced during drying the liquid fabrication dissolves the coating resin of the metal particles and the organic particles at non-fabrication portions, where the liquid fabrication is not applied. The non-fabrication portion is thus solidified, degrading the dimensional accuracy.

An organic solvent-based liquid fabrication for use in a binder jetting (BJ) method is used as the liquid fabrication of the present disclosure. By adjusting "the powder contact angle $\theta$ of a liquid fabrication with inorganic particles", "the viscosity $\gamma$ of the liquid fabrication at 25 degrees C.", "the surface tension $\eta$ of the liquid fabrication at 23° C.", and "$\gamma\cos\theta/\eta$" in appropriate ranges, the liquid fabrication can have a good dischargeability and does not readily ooze to non-fabrication portions so that a fabrication object having a high bending strength with a target dimensional accuracy can be obtained.

Viscosity $\eta$ of Liquid Fabrication

The viscosity $\eta$ of the liquid fabrication at 25° C. is preferably 6 mPa·s or greater, more preferably 12 mPa·s or greater, and furthermore preferably 15 mPa·s or greater. The viscosity is preferably 50 mPa·s or less more preferably 30 mPa·s or less, furthermore preferably 25 mPa·s or less, still more preferably 21 mPa·s or less, still furthermore preferably 19 mPa·s or less, and particularly preferably 18.5 mPa·s or less.

A viscosity $\eta$ of the liquid fabrication within the range specified above stabilizes discharging the liquid from a liquid fabrication applying device such as an inkjet head and, because of this accurate discharging, the bending strength of a fabrication object prior to sintering such as solidified matter and a green object derived from solidified matter ameliorates, thereby enhancing the dimensional accuracy of a fabrication object.

One way of measuring the viscosity $\eta$ of a liquid fabrication at 25° C. is to use a cone plate rotary viscometer (VISCOMETER TV-25, manufactured by TOKI SANGYO CO., LTD.).

Surface Tension $\gamma$ of Liquid Fabrication

The surface tensions $\gamma$ of the liquid fabrication at 23° C. is preferably 20 mN/m or greater, more preferably 22 mN/m or greater, furthermore preferably 25 mN/m or greater, and particularly preferably 27 mN/m or greater. The surface tensions preferably is preferably 40 mN/m or less, more preferably 35 mN/m or less, further more preferably 31 mN/m or less, and particularly preferably 30 mN/m or less.

A surface tension γ of the liquid fabrication within the range specified above stabilizes discharging the liquid from a liquid fabrication applying device such as an inkjet head and, because of this accurate discharging, the bending strength of a fabrication object prior to sintering such as solidified matter and a green object derived from solidified matter ameliorates, thereby enhancing the dimensional accuracy of a fabrication object.

One way of measuring the surface tension γ of a liquid fabrication at 23° C. is to use an automatic surface tensiometer DY-300, manufactured by Kyowa Interface Science Co., Ltd. according to Wilhelmy method (hanging plate method).

Contact Angle θn of Liquid Fabrication (Plate Method)

Generally, an organic solvent-based liquid fabrication has a higher wettability to the surface of an inorganic particle than a water-based liquid fabrication. The contact angle θn (plate method) of a liquid fabrication is substantially 15 degrees or less.

The contact angle θn between a liquid fabrication and a metal plate can be measured at 25° C. by a droplet method using equipment such as a contact angle meter DMs-301, manufactured by Kyowa Interface Science Co., Ltd.

As the metal plate, an aluminum free plate A 6061 LNQ-25-10-5, manufactured by MISUMI Group Inc. is used. A syringe is filled with a liquid fabrication and a droplet of about 2.0 microliters of the liquid fabrication is added dropwise onto a metal plate using an automatic droplet forming feature to obtain a value by a θ/2 method from the shape of a droplet 20 seconds later, which is determined as the contact angle θn (plate method).

Powder Contact Angle θ of Liquid Fabrication between Inorganic Particle and Liquid Fabrication The powder contact angle θ of the liquid fabrication with an inorganic particle is 50 degrees or greater, preferably 52 degrees or greater, more preferably 55 degrees or greater, still more preferably 60 degrees or greater, and particularly preferably 65 degrees or greater. The powder contact angle θ is preferably 80 degrees or less, more preferably 76 degrees or less, furthermore preferably 75 degrees or less, still more preferably 70 degrees or less, still furthermore preferably 69 degrees or less, and particularly preferably 68 degrees or less. A powder contact angle θ of 50 degrees or greater inhibits a liquid fabrication from oozing to a non-fabrication portion, thereby stably producing a fabrication object with a target dimensional accuracy.

The powder contact angle θ of a liquid fabrication with an inorganic particle is a value calculated from the penetration speed when the liquid fabrication permeates a column filled with powder containing the inorganic particle. It can be measured in the following manner using an instrument such as an automatic surface tensiometer DY-500, manufactured by Kyowa Interface Science Co., LTD.

The inorganic particle is used as it is when the type of the inorganic particle is identified. Aluminum powder, ALSI3-30B, manufactured by Toyo Aluminium K.K., is used if the type of the inorganic particle for use in fabrication is unidentified.

The column is filled with 5 g of powder containing inorganic particles. The porosity is adjusted by a powder compressor to the range of from 35.6 to 35.8 percent by mass.

Acetone is used as a liquid having a good wettability to the powder containing the inorganic particles. The capillary radius is obtained assuming that the powder contact angle θ of acetone is 0 degrees. "Capillary radius" means a radius of a gap between inorganic particles when metal particles are packed in a column and the radius can be measured by an automatic surface tensiometer DY-500, manufactured by Kyowa Interface Science Co., LTD.

Subsequently, the speed of the liquid fabrication penetrating the powder containing inorganic particles is measured using an automatic surface tensiometer DY-500, manufactured by Kyowa Interface Science Co., Ltd., in the range of from 150 to 180 seconds after the start of the measurement. The speed of the liquid fabrication penetrating the powder containing the inorganic particles is represented by the Lucas-Washburn equation of the following Mathematical Formula 1.

$$\frac{l(t)_{wetted}^2}{t} = \frac{r\gamma\cos\theta}{2\eta} \quad \text{Mathematical Formula 1}$$

In Mathematical Formula 1, $l(t)_{wetted}$ represents the penetration distance of a liquid fabrication at the time t, t represents the measurement time, r represents the average capillary radius, γ represents the surface tension of the shaping liquid at 23° C., θ represents the powder contact angle of the liquid fabrication with the inorganic particle, and η represents the viscosity of the liquid fabrication at 25° C.

The powder contact angle θ of the liquid fabrication with the inorganic particle is calculated from the capillary radius, the speed of penetration, the viscosity γ of the liquid fabrication at 25° C., and the surface tension θ of the liquid fabrication at 23° C. based on Mathematical Formula 1. These factors of the liquid fabrication are measured three times and the smallest powder contact angle θ is adopted.

γcosθ/η

The liquid fabrication of the present disclosure satisfies the following relationship: γcosθ/η≤1.5 (m/s) (relationship 1), preferably γcosθ/η≤1 (m/s) (relationship 2), and more preferably γcosθ/η≤0.8 (m/s). γcosθ/η is preferably 0.1 (m/s) or more, more preferably 0.3 (m/s) or more, still more preferably 0.4 (m/s) or more, yet still more preferably 0.5 (m/s) or more, particularly preferably 0.6 (m/s) or more.

A liquid fabrication satisfying the relationship of γcosθ/η≤1.5 (m/s) inhibits the liquid fabrication from oozing to a non-fabrication portion, thereby stably achieving a target dimensional accuracy.

γcosθ/η is calculated as an index representing the rate of penetration of a liquid fabrication to inorganic particles.

In the relationship 1, θ represents the powder contact angle, γ represents the surface tension in mN/m of the liquid fabrication at 23° C., and η represents the viscosity in mPa·s of the liquid fabrication at 25° C.

In one aspect of the present disclosure, the amount of a liquid fabrication applied is preferably from 0.033 to 0.33 $\mu L/mm^3$, more preferably from 0.148 to 0.33 $\mu L/mm^3$.

An amount of a liquid fabrication applied of from 0.033 to 0.33 $\mu L/mm^3$ prevents the liquid fabrication from locally oozing or exuding. An amount of a liquid fabrication applied of from 0.148 to 0.33 $\mu L/mm^3$ enhances the bending strength of a fabrication object obtained.

An amount of a liquid fabrication applied of less than 0.033 $\mu L/mm^3$ may collapse a fabrication object. An amount of a liquid fabrication applied of greater than 0.33 $\mu L/mm^3$ may cause the liquid fabrication to locally ooze or exude.

One way of determining the amount of a liquid fabrication applied is as follows. A desired number of droplets are added dropwise from an inkjet head to an already-weighed transparent sheet and the entire mass of the liquid fabrication added is obtained based on the difference between the mass of the transparent sheet and the mass thereof after the addition. Thereafter, the volume of the liquid fabrication per droplet from a nozzle is calculated by dividing the entire mass by the number of nozzles used for the addition, the number of droplets, and the specific gravity of the liquid fabrication. The volume of the liquid fabrication applied to a single voxel is obtained by multiplying the volume of the liquid fabrication per droplet from a nozzle by the number of droplets discharged to a voxel. The volume of the liquid fabrication applied is obtained by converting the volume into the volume per $mm^3$. The size of one voxel can be calculated based on the resolution in the main scanning direction and the sub-scanning direction and the lamination thickness.

Figure 1B:
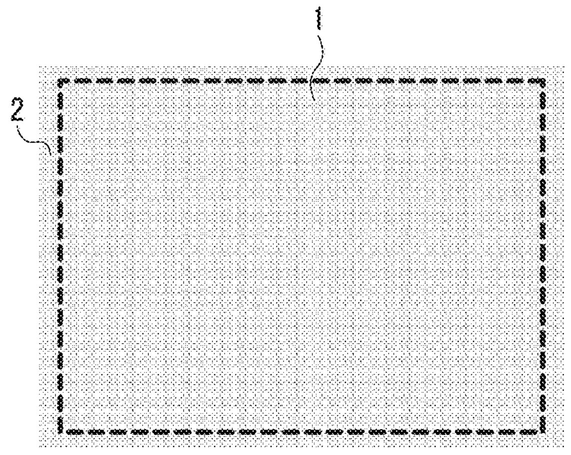
FIG. 1B is a schematic diagram illustrating a state of fabrication in which a liquid fabrication oozes to a non-fabrication region from the target dimension.

In the liquid fabrication of the present disclosure, by adjusting the powder contact angle θ of the liquid fabrication to metal particles, the viscosity γ of the liquid fabrication at 25 degrees C., the surface tension η of the liquid fabrication at 23° C., and $\gamma\cos\theta/\eta$ to appropriate ranges. Resultantly, as illustrated in FIGS. 1A and 1B, an exudation 2 of the liquid fabrication from a target dimension 1 to a non-fabrication portion can be inhibited, thereby producing a fabrication object with a target dimensional accuracy.

Figure 1C:
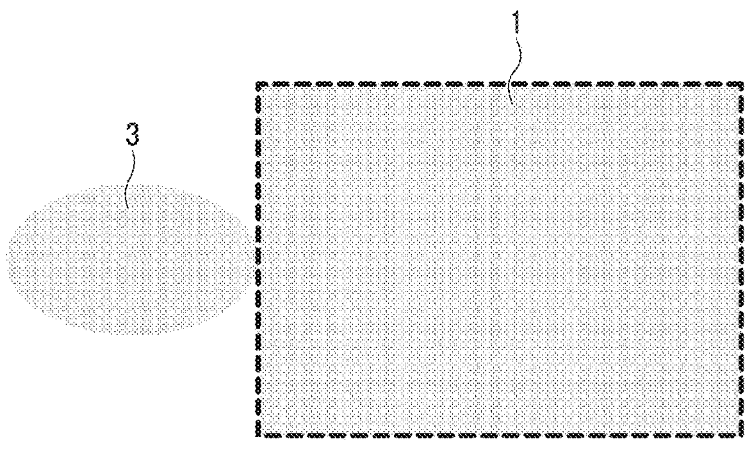
FIG. 1C is a schematic diagram illustrating a state of fabrication in which a liquid fabrication locally oozes from the target dimension.

On the other hand, by setting the amount of the liquid fabrication applied to the range of from 0.033 to 0.33 $\mu L/mm^3$, the liquid fabrication is less likely to overflow. Resultantly, as illustrated in FIG. 1C, a local exudation 3 in which the liquid fabrication locally exudes outside the target dimensional accuracy.

In one embodiment of the present disclosure, the liquid fabrication is preferably applied at a resolution of 600 dpi or greater and more preferably from 600 to 1,200 dpi. By increasing the resolution, the distance between adjacent droplets decreases and are likely to merge even when the amount of fabrication is the same. As the bonding between droplets becomes strong, the bending strength of a fabrication object increases.

One way of adjusting the resolution in the main scanning direction is to change the discharging frequency and the scanning speed of a head. In addition, the resolution in the sub-scanning direction can be adjusted by moving a head by a desired distance in a direction perpendicular to the main scanning direction for each scan.

In one aspect of the present disclosure, the pressure applied to a nozzle for discharging a liquid fabrication is adjusted to be 0 mmaq or greater while a cleaning liquid for cleaning the surface of the nozzle is applied to the surface. By adjusting the pressure applied to a nozzle to be 0 mmaq or greater during cleaning, cleaning liquid is prevented from entering the inside of a nozzle and mixing with the liquid fabrication in the nozzle, which may degrade the features of the liquid fabrication or destabilize discharging of the liquid fabrication.

The pressure applied to a nozzle is preferably from 0 to 25 mmaq while a cleaning liquid is applied to the surface of a nozzle for discharging a liquid fabrication.

One way of adjusting the pressures applied to a nozzle to be in the range of from 0 to 25 mmaq is to adjust the pressure in a tank to which the liquid fabrication is supplied with a pump.

The cleaning liquid is not particularly limited and can be suitably selected to suit to a particular application. For example, water-based or organic solvent-based cleaning liquids can be used. In particular, if an organic solvent similar to the organic solvent in a liquid fabrication is used for a cleaning liquid, the risk of degrading the physical properties of a liquid fabrication attributable to color mixing decreases.

In one aspect of the present disclosure, it is preferable that the time for applying a cleaning liquid to the surface of a nozzle be from 1 to 2 seconds. This aspect has an advantage of being capable of removing powder adhering to the surface of a nozzle and preventing color mixing.

The liquid fabrication of the present disclosure is a liquid composition, which is used for manufacturing a fabrication object and applied to a layer of powder containing inorganic particles.

A fabrication object is manufactured by a method including forming a layer of powder containing inorganic particles, applying a liquid fabrication to the layer, and sequentially repeating the forming and the applying to form a laminate.

The method may optionally include heating the laminate to form solidified matter, removing the powder adhering to the solidified matter to obtain a green object, drying the green object to remove the liquid component remaining in the green object, heating the green object to remove substances including resin derived from the liquid fabrication to obtain a degreased object, sintering the degreased object to obtain a sintered compact, and post-processing the sintered compact. The powder adhering to the solidified matter is referred to as extra powder.

The fabrication object in the present disclosure is a generic term for a solid object having a particular three dimensional form. It includes solidified matter or a structure derived from the solidified matter. Specifically, the fabrication object is a concept representing substances such as solidified matter, a green object, a degreased object, and a sintered compact.

In the present disclosure, “powder” is also referred to as “powdered material”. “Liquid fabrication” is also referred to as “curing liquid” or “reaction liquid”. “Solidified matter” is also referred to as “cured matter”. A solid freeform fabrication object obtained by laminating solidified matter is also referred to as “green object” or “green body”, “sintered compact”, “molded object”, or “fabrication object”. An object obtained by heating and degreasing a green object is also referred to as a degreased object. The “green object” and the “degreased body” may be also collectively referred to as a “sintering precursor”.

The liquid fabrication of the present disclosure contains a resin, an organic solvent, a surfactant, and other optional components.

Resin

The liquid fabrication contains a resin having a structural unit represented by the following Chemical Formula 1.

Chemical Formula 1

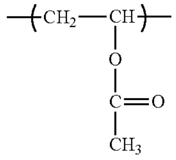

Resin Having Structural Unit Represented by Chemical Formula 1

The resin having the structural unit represented by Chemical Formula 1 is disposed in a layer of powder containing inorganic particles by applying a liquid fabrication to the layer. The resin acts as a binder for binding the inorganic particles in the region to which the liquid fabrication is applied via a heating process in accordance with the softening point of the resin, thereby forming a fabrication object before sintering such as solidified matter and a green object derived from the solidified matter. These fabrication objects before sintering are formed of a resin having the structural unit represented by Chemical Formula 1 that imparts flexibility, which enhances the bending strength. The structural unit refers to a partial structure derived from one or more polymerizable compounds.

The resin having the structural unit represented by Chemical Formula 1 has excellent thermal decomposability. Therefore, the resin is appropriately removed during the degreasing process so that a dense sintered compact is produced through the subsequent sintering process. When metal particles that are assumingly or preferably subjected to sintering are used as the material for forming a fabrication object, the expected results are more favorable. Preferably, 95 percent by mass or greater of a resin having the structural unit represented by Chemical Formula 1 is thermally decomposed during raising the temperature from 30 to 550° C. and more preferably, 97 percent by mass or greater. "The resin is thermally decomposed" means that the main chain of the resin is randomly decomposed or the resin is depolymerized at terminals of the molecular chain so that the resin is removed through vaporization, oxidative decomposition, or combustion. Thermal decomposition can be measured by using TG-DTA (thermogravimetry·differential thermal simultaneous analyzer). Specifically, a resin is heated to 30 to 550° C. at a temperature rising rate of 10° C./minute in atmosphere or nitrogen atmosphere and allowed to leave for two hours after the temperature reaches 550 degrees C. Thereafter the reduction ratio of the mass of the resin between before and after the temperature rising is obtained.

The resin having the structural unit represented by Chemical Formula 1 has hydrophobicity due to the structural unit, which enhances the solubility of the resin in an organic solvent. Therefore, a liquid fabrication containing an organic solvent enhances the solubility of the resin having the structural unit represented by Chemical Formula 1. Resultantly, the liquid fabrication becomes less sticky, so that the liquid fabrication can be appropriately discharged by inkjetting. Preferably, the resin having the structural unit represented by Chemical Formula 1 is soluble in the organic solvent in a liquid fabrication and insoluble in water.

The resin having the structural unit represented by Chemical Formula 1 preferably has a glass transition temperature (Tg) of 0° C. or higher, more preferably 10° C. or higher, and furthermore preferably 20° C. or higher. The glass transition temperature is preferably 100° C. or lower, more preferably 90° C. or lower, and furthermore preferably 80° C. or lower.

The resin having the structural unit represented by Chemical Formula 1 preferably has a softening point of 70° C. or higher, more preferably 80° C. or higher, and furthermore preferably 90° C. or higher. The softening point is preferably 150 degrees C. or lower, more preferably 140° C. or lower, and furthermore preferably 130° C. or lower.

The number average molecular weight (Mn) of the resin having the structural unit represented by Chemical Formula 1 is preferably from 5,000 to 50,000 and more preferably from 10,000 to 30,000. A number average molecular weight (Mn) in the range specified above strikes a balance among enhancing the strength and fabrication accuracy, reducing stickiness of a liquid fabrication, and increasing the proportion of resin in the liquid fabrication.

The resin having the structural unit represented by Chemical Formula 1 may or may not have a structural unit other than the structural unit represented by Chemical Formula 1. The structural unit represented by Chemical Formula other than Chemical Formula 1 includes the structural unit represented by Chemical Formula 3 or Chemical Formula 4 below.

Chemical Formula 3

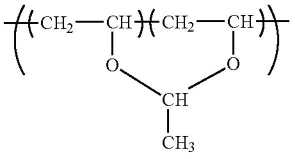

Chemical Formula 4

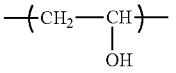

The resin having both of the structural unit represented by Chemical Formula 1 and the structural unit represented by Chemical Formula 3 enhances the bending strength of solidified matter and the fabrication object before sintering such as solidified matter and a green object derived from the solidified matter.

The structural unit represented by Chemical Formula 3 has hydrophobicity like the structural unit represented by Chemical Formula 1, which enhances the solubility of the resin to an organic solvent.

From these points of views, the proportion of the sum of the structural unit represented by Chemical Formula 1 and the structural unit represented by Chemical Formula 3 is preferably 60 percent by mol or greater, more preferably 65 percent by mol or greater, furthermore preferably 70 percent by mol, particularly preferably 75 percent by mol, and most preferably 80 percent by mol to the sum of the structural unit represented by Chemical Formula 1, the structural unit represented by Chemical Formula 3, and the structural unit represented by Chemical Formula 4. This proportion applies to a resin free of the structural unit represented by Chemical Formula 3 and/or the structural unit represented by Chemical Formula 4. The proportion is calculated by determining the sum of the structural unit not contained in the resin as zero.

The resin having the structural unit represented by Chemical Formula 4 in addition to the structural unit represented by Chemical Formula 1 enhances the affinity with inorganic particles in a layer of powder to which a liquid fabrication is applied due to the presence of hydroxyl in the structural unit represented by Chemical Formula 4. This enhancement ameliorates the bending strength of a fabrication object before sintering such as solidified matter and a green object derived from the solidified matter and increases the density of both of a fabrication object before sintering and a fabrication object after sintering. From these points of views, the proportion of the structural unit represented by Chemical Formula 4 is preferably 5 percent by mol or greater, more preferably 15 percent by mol or greater, and furthermore preferably 25 percent by mol to the sum of the structural unit represented by Chemical Formula 1, the structural unit represented by Chemical Formula 3, and the structural unit represented by Chemical Formula 4.

However, the structural unit represented by Chemical Formula 4 has hydrophilicity. When a liquid fabrication contains an organic solvent, an increase in the solubility of a resin having the structural unit represented by Chemical Formula 1 is inhibited as the proportion of the structural unit represented by Chemical Formula 4 increases. Thus, the stickiness of the liquid fabrication does not lower. From these points of views, the proportion of the structural unit represented by Chemical Formula 4 is preferably 40 percent by mol or greater, more preferably 35 percent by mol or greater, furthermore preferably 30 percent by mol, particularly preferably 25 percent by mol, and most preferably 20 percent by mol to the sum of the structural unit represented by Chemical Formula 1, the structural unit represented by Chemical Formula 3, and the structural unit represented by Chemical Formula 4. This proportion applies to a resin free of the structural unit represented by Chemical Formula 3. The proportion is calculated by determining the sum of the structural unit not contained in the resin as zero.

Specific examples of the resin having the structural unit represented by Chemical Formula 1 include, but are not limited to, a polyvinyl acetate resin, a partially saponified polyvinyl acetate resin, and a polyvinyl butyral resin. Of these, polyvinyl acetate resins and partially saponified polyvinyl acetate resins are preferable to reduce the viscosity of a liquid fabrication.

The partially saponified polyvinyl acetate resin has a proportion of the structural unit represented by Chemical Formula 1 of 75 percent by mol or greater and preferably 80 percent by mol or greater to the sum of the structural unit represented by Chemical Formula 1 and the structural unit represented by Chemical Formula 4. These can be used alone or in combination. These resins can be synthesized or procured.

Polyvinyl acetate resin has the structural unit represented by Chemical Formula 1 and is substantially free of the structural unit represented by Chemical Formula 3 and the structural unit represented by Chemical Formula 4.

Polyvinyl acetate resin has the structural unit represented by Chemical Formula 1 and is substantially free of the structural unit represented by Chemical Formula 3 and the structural unit represented by Chemical Formula 4.

Polyvinyl butyral resin has the structural unit represented by Chemical Formula 1 and the structural unit represented by Chemical Formula 3 or has the structural unit represented by Chemical Formula 1, the structural unit represented by Chemical Formula 3, and the structural unit represented by Chemical Formula 4.

The partially saponified polyvinyl acetate resin is obtained by partially saponifying polyvinyl acetate resin. In the partially saponified polyvinyl acetate resin, the proportion of the structural unit represented by Chemical Formula 4 is preferably 40 percent by mol or greater, more preferably 35 percent by mol or greater, furthermore preferably 30 percent by mol, particularly preferably 25 percent by mol, and most preferably 20 percent by mol to the sum of the structural unit represented by Chemical Formula 1 and the structural unit represented by Chemical Formula 4. In other words, the partially saponified polyvinyl acetate resin preferably has a degree of saponification of 40 or less, more preferably 35 or less, furthermore preferably 30 or less, particularly preferably 25 or less, and most preferably 20 or less.

The proportion of the resin having the structural unit represented by Chemical Formula 1 is preferably 5 percent by mass or greater, more preferably 7 percent by mass or greater, furthermore preferably 10 percent by mass or greater, and particularly preferably $\eta$ percent by mass or greater to the entire of a liquid fabrication. The proportion is preferably 30 percent by mass or less, more preferably 25 percent by mass or less, and furthermore preferably 20 percent by mass or less. A proportion of a resin of 5 percent by mass or greater enhances the bending strength of a fabrication object before sintering such as solidified matter and a green object derived from the solidified matter. A proportion of a resin of 30 percent by mass or less lowers the viscosity of a liquid fabrication, so that the liquid fabrication can be suitably discharged by a method including inkjetting.

A resin having a proportion of the sum of the structural unit represented by Chemical Formula 1 and the structural unit represented by Chemical Formula 3 of 95 percent by mol or greater to the sum of the structural unit represented by Chemical Formula 1, the sum of the structural unit represented by Chemical Formula 3, and the structural unit represented by Chemical Formula 4 enhances the solubility of the resin to an organic solvent, thereby lowering the viscosity of a liquid fabrication, so that the proportion of such a resin to the entire of a liquid fabrication may be as high as 15 percent by mass or greater or 20 percent by mass or greater. This proportion further enhances the bending strength of a fabrication object before sintering such as solidified matter and a green object derived from the solidified matter.

The proportion in percent by mol represented by each Chemical Formula in a resin can be obtained by a method such as polyvinyl alcohol testing method according to JIS-K6276-1994 format.

The liquid fabrication of the present disclosure may optionally furthermore contain a resin having a structural unit represented by Chemical Formula 2 and polyvinyl alcohol resin in addition to the resin having a structural unit represented by Chemical Formula 1.

Resin Having Structural Unit Represented by Chemical Formula 2

Chemical Formula 2

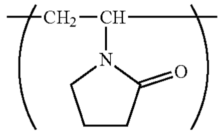

The resin having the structural unit represented by Chemical Formula 2 is disposed in a layer of powder containing metal particles by applying a liquid fabrication to the layer. The resin acts as a binder for binding the metal particles in the region to which the liquid fabrication is applied via a heating process in accordance with the softening point of the resin, thereby forming a fabrication object before sintering such as solidified matter and a green object derived from the solidified matter. These fabrication objects before sintering are formed of a resin having a structural unit represented by Chemical Formula 2 having a five-membered ring lactam structure, which has a high affinity with metal. Metal particles are thus firmly bound to each other, thereby enhancing the bending strength.

The resin having the structural unit represented by Chemical Formula 2 has excellent thermal decomposability if the temperature rising profile is suitably adjusted. Therefore, this resin is appropriately removed during the degreasing process so that a dense sintered compact is produced through the subsequent sintering process. When metal particles that are assumingly or preferably subjected to sintering are used as the material for forming a fabrication object, the expected results are more favorable. Preferably, 95 percent by mass or greater of a resin having the structural unit represented by Chemical Formula 2, more preferably, 97 percent by mass or greater, is thermally decomposed during raising the temperature from 30 to 550° C.

However, the resin having a structural unit represented by Chemical Formula 2 forms a cross-linking structure depending on the temperature condition (for example, heating at 160 degrees C. or higher), which may inhibit the effect derived from a high thermal decomposition property. Therefore, a resin having the structural unit represented by Chemical Formula 1 is preferable to a resin having the structural unit represented by Chemical Formula 2 when metal particles assumingly or preferably subjected to sintering are used as the material for forming a fabrication object in terms of ease of handling.

Moreover, a resin having a structural unit represented by Chemical Formula 2 having a five-membered ring lactam structure has a good solubility to particular organic solvents, mainly polar solvents, thereby lowering the viscosity of a liquid fabrication. Resultantly, the liquid fabrication becomes less sticky, so that the liquid fabrication can be appropriately discharged by inkjetting. The resin having a structural unit represented by Chemical Formula 2 can furthermore lower the viscosity of a liquid fabrication when the resin is used in combination with a component 1 (e.g., cyclic ester: lactones) and a component 2 (e,g., glycolether diethers). Since the viscosity of a liquid fabrication can be lowered, the proportion of the resin having a structural unit represented by Chemical Formula 2 can be as much as, for example, 15 percent by mass or greater to the entire of the liquid fabrication. This proportion further enhances the bending strength of a fabrication object before sintering such as solidified matter and a green object derived from the solidified matter.

The resin having the structural unit represented by Chemical Formula 2 preferably has a softening point of 70° C. or higher, more preferably 80° C. or higher, and furthermore preferably 90° C. or higher. The softening point is preferably 180 degrees C. or lower, more preferably 170° C. or lower, and furthermore preferably 160° C. or lower.

The number average molecular weight (Mn) of the resin having the structural unit represented by Chemical Formula 2 is preferably from 3,000 to 50,000 and more preferably from 5,000 to 40,000. A number average molecular weight (Mn) in the range specified above strikes a balance among enhancing the strength and fabrication accuracy, reducing stickiness of a liquid fabrication, and increasing the concentration of resin in the liquid fabrication.

A specific example of the resin having the structural unit represented by Chemical Formula 2 is a polyvinyl pyrrolidone resin. Such a resin can be synthesized or procured.

Polyvinyl Alcohol Resin

Polyvinyl alcohol resin is disposed in a layer of powder containing inorganic particles by applying a liquid fabrication to the layer. The resin acts as a binder for binding the inorganic particles in the region to which the liquid fabrication is applied via a heating process in accordance with the softening point of the resin, thereby forming a fabrication object before sintering such as solidified matter and a green object derived from the solidified matter.

Polyvinyl alcohol resin includes a polymer containing vinyl alcohol as a structure unit or saponified matter thereof in addition to polyvinyl alcohol resin.

The average polymerization degree and the saponification degree of polyvinyl alcohol can be suitably adjusted by adjusting vinyl acetate as a raw material.

The average polymerization degree of polyvinyl alcohol resin is measured according to JIS K6726 format and preferably from 100 to 2,000 and more preferably from 100 to 1,000. When the average polymerization degree is too high, the melt viscosity becomes high, which degrades fabrication property or moldability. Conversely, when the average polymerization degree is too low, an object obtained by fabrication or molding may be mechanically weak.

The saponification degree (measured according to JIS K 6726 format) of polyvinyl alcohol resin is not particularly limited and selected to suit to factors such as a particular application, solubility, and moisture resistance. It is preferably from 0 to 100 percent by mol and a partially saponified polyvinyl alcohol resin of 80 percent by mol or less is preferable to a completely saponified polyvinyl alcohol resin.

Organic Solvent

The organic solvent is a liquid component for keeping a liquid fabrication in liquid state at room temperature.

Since the liquid fabrication is preferably a non-water-based liquid fabrication because it contains an organic solvent. "Non-water-based liquid fabrication" contains an organic solvent as a liquid composition and the organic solvent has the largest mass among the liquid compositions in the liquid fabrication. The proportion of the organic solvent to the liquid compositions in the entire of the liquid compositions is preferably 90 percent by mass or greater and more preferably 95 percent by mass or greater.

A resin having the structural unit represented by Chemical Formula 1 is particularly well dissolved in a non-water-based liquid fabrication, thereby lowering the viscosity of the liquid fabrication. The non-water-based liquid fabrication can be reworded as a liquid fabrication that is substantially free of water in some occasions. Therefore, the non-water-based liquid fabrication can be used even when materials constituting metal particles as inorganic particles are highly active metal, in other words, water-prohibitive materials such as aluminum, zinc, magnesium, or alloys thereof. For example, aluminum brought into contact with water forms film of aluminium hydroxide, which lowers the sintering density of a sintered compact if a liquid fabrication contains water in a large proportion. A water-free liquid fabrication is free of this issue. In another example, aluminum brought into contact with water produces hydrogen, which is difficult to handle. A liquid fabrication without water is free of this issue, too.

Specific examples of the organic solvent include, but are not limited to, n-octane, m-xylene, solvent naphtha, diisobutyl ketone, 3-heptanone, 2-octanone, acetylacetone, butyl acetate, amyl acetate, n-hexyl acetate, n-octyl acetate, ethyl butyrate, ethyl valerate, ethyl caprylate, ethyl octanoate, ethyl acetoacetate, ethyl 3-ethoxypropionate, diethyl oxalate, diethyl malonate, diethyl succinate, diethyl adipate, bis-2-ethylhexyl maleate, triacetin, tributyrin, propylene glycol monomethyl ether acetate, ethylene glycol monobutyl ether acetate, dibutyl ether, 1,2-dimethoxybenzene, 1,4-dimethoxybenzene, diethylene glycol monobutyl ether, diethylene glycol dimethyl ether, triethylene glycol dimethyl ether, 2-methoxy-1-methylethyl acetate, γ-butyrolactone, propylene carbonate, cyclohexanone, and butyl cellosolve. These can be used alone or in combination.

A resin having a structural unit represented by Chemical Formula 1 can be used with any organic solvent without a particular limitation. It can be suitably selected to suit to a particular application. It is preferable to use an organic solvent having at least one structure selected from the group consisting of an alkoxy group, an ether bond, and an ester bond, more preferable, an organic solvent having an ether bond, and furthermore preferable, an alkylene glycol dialkyl ether compound. These organic solvents enhance the solubility of a resin having a structural unit represented by Chemical Formula 1, thereby further lowering the viscosity of a liquid fabrication. Resultantly, the liquid fabrication becomes less sticky, so that the liquid fabrication can be appropriately discharged by inkjetting.

"Alkylene glycol dialkyl ether compound" is represented by $R_1$—(O—$R_2$)$_m$—$OR_3$, and $R_1$ and $R_3$ each, independently represent linear or branched alkyl groups having 1 to 5 carbon atoms, preferably 1 or 2 carbon atoms. $R_2$ represents a linear or branched alkylene group having 2 to 5 carbon atoms, preferably 2 or 3 carbon atoms. The symbol "m" represents an integer of from 1 to 5 and is more preferably 2 or 3.

Specific examples of the alkylene glycol dialkyl ether compound include, but are not limited to, diethylene glycol dimethyl ether, triethylene glycol dimethyl ether, diethylene glycol ethyl methyl ether, and diethylene glycol butyl methyl ether. Of these, diethylene glycol dimethyl ether and triethylene glycol dimethyl ether are preferable, and triethylene glycol dimethyl ether is more preferable.

The resin having the structural unit represented by Chemical Formula 2 is preferably used in combination with a polar solvent as an organic solvent. Specifically, it is preferable to use at least one member selected from the component 1, which is the group consisting of cyclic esters (lactones), cyclic ketones, and alkylene glycol monoalkyl ethers and more preferable to use at least one member selected from the component 2, which is the group consisting of alkylene glycol dialkyl ethers in addition to the at least one member selected from the component 1. Such an organic solvent enhances the solubility of the resin having the structural unit represented by Chemical Formula 2, thereby lowering the viscosity of a liquid fabrication. Resultantly, the liquid fabrication becomes less sticky, so that the liquid fabrication can be appropriately discharged by inkjetting. In order to furthermore increase the solubility of the resin having the structural unit represented by Chemical Formula 2, the component 1 is preferably a group consisting of cyclic esters (lactones) and cyclic ketones.

When both of the at least one member selected from the component 1 and at least one member selected from the component 2 are used as the organic solvent in combination with the resin having the structural unit represented by Chemical Formula 2, the mass ratio (component 1/component 2) of the sum of the component 1 to the sum of the component 2 is preferably from 60:40 to 100:0. A mass ratio of from 60:40 to 100:0 enhances the solubility of the resin having the structural unit represented by Chemical Formula 2, thereby lowering the viscosity of liquid fabrication.

Specific examples of the component 1, which is the group consisting of cyclic esters (lactones), cyclic ketones, and alkylene glycol monoalkyl ethers include, but are not limited to, γ-butyrolactone, propylene carbonate, and cyclohexanone.

Specific examples of the component 2, which is the group consisting of alkylene glycol dialkyl ethers include, but are not limited to, diethylene glycol dimethyl ether, triethylene glycol dimethyl ether, diethylene glycol ethyl methyl ether, and diethylene glycol butyl methyl ether. Of these, diethylene glycol dimethyl ether and triethylene glycol dimethyl ether are preferable.

"Alkylene glycol monoalkyl ethers" is represented by $R_4$—(O—$R_5$)$_n$—OH, and $R_4$ represents a linear or branched alkyl group having 1 to 5 carbon atoms. $R_5$ represents a linear or branched alkylene group having 2 to 5 carbon atoms. The symbol "n" represents an integer of from 1 to 5.

In order to further reduce the viscosity of a liquid fabrication, the organic solvents (component 1 and component 2) mentioned above are selectively used since the type of an organic used in combination has a larger impact for a resin having the structural unit represented by Chemical Formula 2 than a resin having the structural unit represented by Chemical Formula 1. Therefore, it is preferable to use a resin having the structural unit represented by Chemical Formula 1 rather than a resin having the structural unit represented by Chemical Formula 2 to provide a wider range of selections of materials for preparing a liquid fabrication.

The viscosity of the organic solvent is preferably low, and concretely, preferably from 5 to 50 mPa·s and more preferably from 8 to 30 mPa·s at 25° C. A viscosity of an organic solvent within the range specified above is likely to lower the viscosity of a liquid fabrication containing an organic solvent, which stabilizes discharging from a liquid fabrication applying device such as an inkjet head. Moreover, because of this stabilized accurate discharging, the bending strength of a fabrication object prior to sintering such as solidified matter and a green object derived from solidified matter ameliorates, thereby enhancing the dimensional accuracy of the fabrication object.

Viscosity can be measured, for example, according to the measuring method described in JIS K7117 format.

The organic solvent preferably has a high boiling point, and specifically, it is more preferably 150° C. or higher, and furthermore preferably 180° C. or higher. This is because when a liquid fabrication containing an organic solvent having a high boiling point is discharged by inkjetting, the liquid fabrication little dries, which prevents the resin in the liquid fabrication from precipitating at or around a nozzle so that the nozzle does not clog. The organic solvent having a high boiling point is not particularly limited and can be suitably selected to suit to a particular application. Specific examples include, but are not limited to, γ-butyrolactone (boiling point of 204° C.), propylene carbonate (boiling point of 242 degrees C., cyclohexanone (boiling point of 155.6° C.), diethylene glycol dimethyl ether (boiling point of 162° C.), and triethylene glycol dimethyl ether (boiling point of 216 degrees C.).

The proportion of the organic solvent to the entire of a liquid fabrication is preferably from 60 to 95 percent by mass and more preferably from 70 to 95 percent by mass. An organic solvent having a proportion of from 60 to 95 percent by mass enhances the solubility of a resin, thereby lowering the viscosity of a liquid fabrication. Resultantly, the liquid fabrication becomes less sticky, so that the liquid fabrication can be appropriately discharged by inkjetting. In addition, since a liquid fabrication is prevented from drying at a liquid fabrication applying device, a liquid fabrication having an excellent discharging stability can be provided.

The mass ratio (organic solvent/resin) of the mass of an organic solvent and the mass of a resin is preferably from 75:25 to 95:5. A mass ratio (organic solvent/resin) of 75:25 or greater enhances the solubility of the resin, thereby lowering the viscosity of a liquid fabrication. Resultantly, the liquid fabrication becomes less sticky, so that the liquid fabrication can be appropriately discharged by inkjetting. A mass ratio (organic solvent/resin) of 95:5 or less enhances the bending strength of a fabrication object before sintering such as solidified matter and a green object derived from the solidified matter.

The proportion of the sum of the mass of the organic solvent and the mass of the resin to the entire of a liquid fabrication is preferably 90 percent by mass or greater, more preferably 95 percent by mass or greater, furthermore preferably 99 percent by mass or greater, and particularly preferably 99.5 percent by mass or greater. The liquid fabrication may be substantially free of components other than the organic solvent and the resin. This means that the component other than the organic solvent and the resin is not the first choice as the material for preparing a liquid fabrication or the component other than the organic solvent and the resin is not detectable by a known and common technical method.

A proportion of the sum of the mass of an organic solvent and the mass of a resin to the entire mass of a liquid fabrication of 90 percent by mass or greater increases the amount of the resin contained in the liquid fabrication, thereby enhancing the bending strength of a fabrication object before sintering such as solidified matter and a green object derived from the solidified matter. In addition, since the content of components other than the organic solvent and the resin, such as materials including metal particles insoluble in the liquid fabrication, decreases or is substantially zero, the viscosity of the liquid fabrication lowers, thereby enhancing the discharging stability and storage stability of the liquid fabrication.

Surfactant

The surfactant mentioned above is added in order to increase the powder contact angle θ between a liquid fabrication and an inorganic particle and enhance the dimensional accuracy of a fabrication object obtained.

The surfactant is preferably at least one of a fluorine surfactant and a silicone surfactant. By using a fluorine surfactant and a silicone surfactant in a liquid fabrication, the liquid fabrication is prevented from exuding to a non-fabrication portion and a fabrication object with a target dimensional accuracy can be stably obtained.

Such a fluorine surfactant can be procured.

Specific examples include, but are not limited to, Surflon S-693 (manufactured by AGC SEIMI CHEMICAL CO., LTD.) and KF-353 (manufactured by Shin-Etsu Chemical Co., Ltd.).

Such silicone surfactants can be procured. A specific example is Silface SAG020 (manufactured by Nissin Chemical Co., Ltd.).

The proportion of the surfactant to the entire of the liquid fabrication is preferably 0.001 percent by mass or greater, more preferably 0.01 percent by mass or greater, furthermore preferably 0.05 percent by mass or greater, particularly preferably 0.1 percent by mass or greater, and most preferably 0.3 percent by mass or greater. The proportion is preferably 5 percent by mass or less, more preferably 3 percent by mass or less, furthermore preferably 1 percent by mass or less, and particularly preferably 0.5 percent by mass or less.

A content of the surfactant in the range specified above increases the powder contact angle θ of the liquid fabrication with the inorganic particle, thereby enhancing the dimensional accuracy of a fabrication object.

Other Components

The other components are not particularly limited and can be suitably selected to suit to a particular application. Examples include, but are not limited to, water, a drying preventive agent, a viscosity modifier, a permeating agent, a defoaming agent, a pH regulator, a preservative, a mildew-proofing agent, a colorant, a preserving agent, and a stabilizer.

Water

The liquid fabrication is substantially free of water. In the present disclosure, "substantially free of water" means the proportion of water to the entire of a liquid fabrication is 10 percent by mass or less, preferably 5 percent by mass or less, more preferably 3 percent by mass or less, furthermore preferably 1 percent by mass or less, and particularly preferably 0 percent by mass. A liquid fabrication substantially free of water enhances the solubility of the resin mentioned above, which furthermore lowers the viscosity of the liquid fabrication. Moreover, hydrogel containing a massive quantity of water is prevented from forming around the resin, which inhibits an increase in the viscosity of the liquid fabrication. Resultantly, the liquid fabrication can be appropriately discharged by inkjetting. "Liquid fabrication substantially free of water" means that water is not positively selected as the material for preparing a liquid fabrication or water is not detectable by a known and common technical method.

In addition, a liquid fabrication substantially free of water can be used even when materials constituting inorganic particles are highly active metal, in other words, water-prohibitive materials such as zinc, magnesium, or alloys thereof. For example, aluminum brought into contact with water forms film of aluminium hydroxide, which lowers the sintering density of a sintered compact if a liquid fabrication contains water in a large amount. A waterless liquid fabrication is free of this issue. In another example, aluminum brought into contact with water produces hydrogen, which is difficult to handle. A waterless liquid fabrication is free of this issue, too.

Method of Manufacturing Liquid Fabrication

The method of manufacturing the liquid fabrication mentioned above is not particularly limited and can be suitably selected to suit to a particular application. One way is to mix and stir the materials specified above.

Inorganic Particle

The inorganic particle is not particularly limited as long as it takes a form of powder or particle and can be suitably selected to suit to a particular application. Examples include, but are not limited to, metal, ceramics, carbon, sand, and magnetic materials. Of these, metal and ceramics are preferable because they can be subjected to sintering as the last process to obtain an extremely strong solid freeform fabrication object.

Examples of ceramics include, but are not limited to, oxides, carbides, nitrides, and hydroxides.

An example of the oxide is a metal oxide. Specific examples of the metal oxides include, but are not limited to, silica ($SiO_2$), alumina ($Al_2O_3$), zirconia ($ZrO_2$), and titania ($TiO_2$). These can be used alone or in combination.

The metal particle contains metal as a constituent material. The constituent materials of a metal particle are not particularly limited as long as it contains metal. They may contain a material other than metal but preferably contains metal as the main material. Metal as the main material means the proportion of the metal in a metal particle to the entire mass of the metal particle is 50 percent by mass or greater, preferably 60 percent by mass or greater, more preferably 70 percent by mass or greater, furthermore preferably 80 percent by mass or greater, and particularly preferably 90 percent by mass or greater.

Specific examples of the constituent material of the metal particle include, but are not limited to, magnesium (Mg), aluminum (Al), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), lead (Pd), silver (Ag), indium (In), tin (Sn), tantalum (Ta), tungsten (W), neodymium (Nd), and alloys of these metals. These can be used alone or in combination. Of these, stainless steel (SUS), iron (Fe), copper (Cu), silver (Ag), titanium (Ti), magnesium (Mg), zinc (Zn), aluminum (Al), and an alloy of these metals are preferable. Aluminum, zinc, magnesium, and an alloy of these metals are more preferable and an aluminum alloy is particularly preferable.

Specific examples of the aluminum alloys include, but are not limited to, $AlSi_{10}Mg$, $AlSi_{12}$, $AlSi_7Mg_{0.6}$, $AlSi_3Mg$, $AlSi_9Cu_3$, Scalmalloy, $ADC_{12}$, and $AlSi_3$.

The method of manufacturing metal particles is not particularly limited and can be suitably selected from known methods. Metal particles can be manufactured by a method such as a pulverization method of pulverizing a solid by processes such as compression, impact, and friction, an atomizing method of spraying a molten metal to obtain quenched powder, a precipitation method of precipitating a component dissolved in a liquid, and a gas-phase reaction method of gasification for crystallization. Of these, the atomizing method is preferable to obtain a spherical form with a less fluctuation regarding the particle size. The atomizing method is not particularly limited and can be suitably selected to suit to a particular application. Specific examples include, but are not limited to, water atomization methods, gas atomization methods, centrifugal atomization, and plasma atomization.

The metal particle can be procured. Specific examples of the marketed products include, but are not limited to, pure A1 (A1070-30BB, manufactured by Toyo Aluminium K.K.), pure Ti (manufactured by OSAKA Titanium technologies Co., Ltd.), SUS316L (PSS316L, manufactured by SANYO SPECIAL STEEL Co., Ltd.), $AlSi_{10}Mg$ ($Si_{10}MgBB$, manufactured by Toyo Aluminium K.K.), $SiO_2$ (Excelleka SE-15K, manufactured by Tokuyama Corporation), $AlO_2$ (TAIMICRON TM-5D, manufactured by Taimei Chemicals Co., Ltd.), $ZrO_2$ (TZ-B-53, manufactured by TOSOH CORPORATION), and powdered aluminum powder (ALSI3-30B, Manufactured by Toyo Aluminium K.K.).

The volume average particle diameter of the metal particle is not particularly limited and can be suitably selected to suit to a particular application. It is preferably from 2 to 100 μm and more preferably from 8 to 50 μm. A volume average particle diameter of the metal particles of 2 μm or greater inhibits the aggregation of the metal particles, a decrease in the efficiency of producing a fabrication object, and the degradation of ease of handling of the metal particles. A volume average particle diameter of the metal particles of 100 μm or less inhibits a decrease in contact points between the metal particles and an increase in voids, which reduces a decrease in the strength of fabrication object.

The particle size distribution of the metal particle is not particularly limited and can be suitably selected to a particular application. It is preferable to have a sharp particle size distribution.

The volume average particle diameter and the particle size distribution of the metal particles can be measured by a known particle size measuring device such as a particle size distribution measuring device (Microtrac MT3000II series, manufactured by MicrotracBEL Corp.).

A typical method of manufacturing a fabrication object includes applying liquid to metal particles of a metal substrate and resin that covers the substrate to demonstrate binding feature of the coating resin. In the present disclosure, the resin in the liquid fabrication demonstrates this binding feature. Therefore, the surface of metal particles of the present disclosure may or may not be covered with resin. If metal particles not covered with resin are used, it is possible to avoid producing unintentional solidified matter at powder regions where a liquid fabrication is not applied, in other words, non-fabrication region, by binding metal particles with coating resin via heating.

"Not covered with resin" means that, for example, the ratio of the surface area of the resin to the surface area of the metal particle, i.e., surface coverage, is less than 15 percent or less, including 0 percent. One way of obtaining the surface coverage is to measure the surface area of a metal particle covered with resin and the entire surface area of the metal particle in a two-dimensional photo of the metal particle and calculate the ratio of the surface area to the entire surface area. What part is covered with the resin is determined by utilizing a method such as element mapping by energy dispersive X-ray spectroscopy such as SEM-EDS.

Powder Containing Inorganic Particle

The inorganic particle mentioned above is treated as powder, a collective form containing multiple inorganic particles. A liquid fabrication is applied to a layer of the powder to manufacture a fabrication object.

The powder may contain other optional components in addition to the inorganic particle.

Examples of the other optional components include, but are not limited to, a filler, a leveling agent, a sintering helping agent, and a resin particle polymer.

Filler is a material effective to adhere to the surface of an inorganic particle and fill the gap between inorganic particles. Filler is used to enhance the flowability of powder and increase the contact points between inorganic particles, thereby reducing the gap therebetween and enhancing the strength and the dimensional accuracy of a fabrication object.

Leveling agents are suitable to adjust the wettability of the surface of the layer of powder. Leveling agent can be used to enhance the permeation of a liquid fabrication to the layer of powder, thereby increasing the strength of a fabrication object.

Sintering helping agents are a material suitable to increase the efficiency of sintering when sintering a solid freeform fabrication object. Sintering helping agent can enhance the strength of a fabrication object and lower the sintering temperature, thereby completing sintering in a short time.

Resin polymer particles are a material effective to adhere to the surface of inorganic particles and also referred to as organic external additives. The average particle diameter of resin polymer particle is not particularly limited and can be suitably selected to suit to a particular application. It is preferably from 0.1 to 10 μm and more preferably from 0.1 to 1 μm.

Fabrication Kit for Fabrication

The fabrication kit of the present disclosure contains the liquid fabrication of the present disclosure, inorganic particles, and other optional components such as powder remover.

In addition, the inorganic particles and the liquid fabrication may be present separately from each other in a fabrication kit. Both are not limited to a case in which a liquid fabrication storage unit containing the liquid fabrication and an inorganic particle storage unit containing the inorganic particles are integrated. The fabrication kit includes a case where inorganic particles and a liquid fabrication are used in combination and a case where inorganic particles and liquid fabrication are substantially induced to be used in combination even when a liquid fabrication and inorganic particles are stored in respective independent storage units.

As the inorganic particles in the fabrication kit, the same inorganic particles as those described above in the liquid fabrication can be used.

It is preferable that the inorganic particles be metal particles and contain at least one member selected from aluminum, zinc, magnesium, and alloys thereof. Preferably, the surface of the inorganic particle is not covered with resin.

Method of Manufacturing Fabrication Object

A method of manufacturing a fabrication object of the present disclosure includes forming a layer of powder containing inorganic particles, applying a liquid fabrication to the layer of powder, and repeating the forming and the applying to form a laminate.

The method may optionally include heating the laminate to form solidified matter, removing extra powder adhering to the solidified matter to obtain a green object, drying the green object to remove the liquid component remaining in the green object, heating the green object to remove substances including resin derived from the liquid fabrication to obtain a degreased object, sintering the degreased object to obtain a sintered compact, and post-processing the sintered compact.

Forming Layer of Powder

The process of forming a layer of powder is to form a layer of powder containing inorganic particles and is conducted by a device for forming a layer of powder.

The layer of powder is formed on a support (fabrication stage). The method of forming a thin layer of powder by disposing the powder on a support is not particularly limited and can be suitably selected to suit to a particular application. Specific examples include, but are not limited to, a method using a known counter rotation mechanism (counter roller) for use in a selective laser sintering method disclosed in Japanese Patent No. 3607300, a method of extending powder using a member such as a brush, a roller, and a blade, a method of pressing the surface of powder using a pressure member to extend the powder, and a method of using a known additive manufacturing device.

A layer of powder is formed by the following method using a powder layer forming device such as a counter rotation mechanism (counter roller), a brush, a blade, or a pressing member.

Powdered material is placed on a support disposed to elevate up and down slidably along the inside wall of the outer frame (also referred to as "form", "hollow cylinder" and "tubular structure") with a device including a counter rotation mechanism (counter roller), a brush, a roller, a blade, or a pressing member. At this point, when the support is movable up and down in the outer frame, the support is positioned slightly lower than the upper aperture of the outer frame. That is, while placing the support below the upper aperture by a layer thickness of the powder material, the powder material is placed on the support. The thin layer of powder is thus disposed on the support.

The thickness of the layer of powder is not particularly limited and can be selected to suit to a particular application. For example, the average thickness of a single layer is preferably from 30 to 500 μm and more preferably from 60 to 300 μm.

An average thickness of 30 μm or greater enhances the strength of solidified matter formed by applying a liquid fabrication to powder and prevents shapeless of a fabrication object which may occur in the following process such as sintering. An average thickness of 500 μm or less enhances the dimensional accuracy of a fabrication object derived from solidified matter formed by applying a liquid fabrication to powder.

Incidentally, the average thickness is not particularly limited and can be measured according to a known method.

The powder supplied by the device for forming a layer of powder may be accommodated in a powder storage device. The powder storage device is a member such as a container accommodating powder and includes, but is not limited to, a storage tank, bag, cartridge, and tank.

Applying Liquid Fabrication

In the applying liquid fabrication, a liquid fabrication is applied to the layer of powder formed during the forming layer of powder. The liquid is applied with a device for applying a liquid fabrication.

The liquid fabrication is preferably discharged to the layer of powder as a method of applying a liquid fabrication to a layer of powder. The method of discharging a liquid fabrication is not particularly limited and can be suitably selected to suit to a particular application.

Specific examples of methods of discharging include, but are not limited to, a spraying method, an inkjet printing method, or a dispenser method. Of these, the dispenser method has an excellent liquid quantitative property but the application area is small. The spraying method is capable of simply forming a fine discharging material at a wide application area, i.e., demonstrating excellent applicability, but the quantitative property thereof is poor so that discharged matter scatters due to the spray stream. The inkjet method is thus preferable. The inkjet printing has a good quantitative property in comparison with the spraying method and moreover a wider application area in comparison with the dispenser method. Accordingly, the inkjet printing is preferable in order to accurately and efficiently form a complex fabrication object.

The device for discharging a liquid fabrication by inkjetting is an inkjet head including a nozzle for discharging the liquid fabrication. As the inkjet head, an inkjet head in a known inkjet printer can be suitably used. An example of the inkjet head in an inkjet printer is an industrial inkjet RICOH MH/GH SERIES, manufactured by Ricoh Company, Ltd. An example of the inkjet printer is SG7100, manufactured by Ricoh Company Ltd.

The liquid fabrication supplied to the device for applying a liquid fabrication may be accommodate in the liquid fabrication storage unit. The liquid fabrication storage unit is a member such as a container accommodating a liquid fabrication and includes, but is not limited to, a storage tank, bag, cartridge, and tank.

Laminating (Repeating Forming and Applying)

During the laminating, the processes of the forming and the applying are repeated to form a laminate with a laminating device.

"A laminate" means a structure in which layers of powder having regions where a liquid fabrication is applied are laminated. This structure may or may not include a solid object including a particular solid form inside.

The laminating includes placing powder in a thin layer (forming a layer of powder) and applying a liquid fabrication to the thin layer (applying a liquid fabrication). This laminating forms a region in the layer of powder to which the liquid fabrication is applied. The laminating furthermore includes placing the powder on the thin layer having a region to which the liquid fabrication is applied in the same manner as described above (forming a layer of powder) and applying the liquid fabrication to the thin layer (applying a liquid fabrication). This laminating forms a region in the newly formed layer of powder to which the liquid fabrication is applied. The uppermost region in the laminated thin layer of powder to which the liquid fabrication is applied is continuous to the region present under the uppermost region, to which the liquid fabrication is applied. Resultantly, a region having a thickness corresponding to the two layers of powder to which the liquid fabrication is applied is obtained.

Heating

In the heating, a laminate formed during the laminating is heated by a heating device to form solidified matter.

"Solidified" means a state of maintaining a particular form. "Solidified matter" means a structure having a solid object maintaining a particular solid form. "Solidified matter" is not subjected to removing extra powder adhering to the solidified matter. The extra powder does not constitute a solid object.

The heating temperature during heating is preferably higher than the softening point of resin. Therefore, the resin acts as a binder for binding inorganic particles in the region to which a liquid fabrication is applied and forms a fabrication object before sintering such as solidified matter and a green object derived from the solidified matter.

The heating device is not particularly limited and can be suitably selected to suit to a particular application. It includes, but is not limited to, a drier and an environmental experiment chamber.

Removing Extra Powder

In the removing extra powder, extra powder, which adheres to solidified matter, is removed by an extra powder removing device to obtain a green object.

"Green object" is a solid object maintaining a particular solid form, obtained through the process of removing extra powder that does not constitute solidified matter. Preferably, the green object is substantially free of extra powder.

Extra powder is removed preferably by air blowing from solidified matter or dipping solidified matter in a remover and more preferably by both of air blowing and dipping.

The solidified matter after heating is buried in extra powder to which a liquid fabrication is not applied. Extra powder adheres to the surface and the inside of this buried solidified matter when it is taken out of extra powder. Removing such extra powder from the solidified matter is not easy. If solidified matter has a complicated surface shape or an inside having a flowing path, this removal becomes more difficult. A fabrication object fabricated by typical binder jetting is not strong if the object is not sintered. Therefore, the fabrication object may collapse if the pressure of air blowing with a blower increases.

On the other hand, solidified matter formed by using the liquid fabrication of the present disclosure containing the resin mentioned above has a bending strength enough to bear the pressure of air blowing. The bending strength of solidified matter is preferably 3 MPa or greater and more preferably 5 Mpa or greater at the three-point bending test.

Remover

The remover contains an organic solvent and other optional components. The organic solvent contained in a liquid fabrication is also referred to as the first organic solvent and the organic solvent contained in a remover is also referred to the second organic solvent to distinguish one from the other.

Examples of the organic solvent include, but are not limited to, ketone, halogen, alcohol, ester, ether, hydrocarbon, glycol, glycol ether, glycol ester, pyrrolidone, amide, amine, and carbonate ester.

Specific examples of ketone include, but are not limited to, acetone, methyl ethyl ketone, diethyl ketone, methyl propyl ketone, methyl isobutyl ketone, methyl amyl ketone, cyclohexanone, isophorone, acetophenone, and diacetone alcohol.

Specific examples of halogen include, but are not limited to, methylenechloride, trichloroethylene, perchloroethylene, HCFC 141-b, HCFC-225, 1-bromopropane, chloroform, and o-dichlorobenzene.

Specific examples of alcohol include, but are not limited to, methanol, ethanol, butanol, isobutanol, isopropyl alcohol, normal propyl alcohol, tertiary butanol, secondary butanol, 1,3-butanediol, 1,4-butanediol, 2-ethylhexanol, and benzyl alcohol.

Specific examples of ester include, but are not limited to, methyl acetate, ethyl acetate, butyl acetate, isobutyl acetate, sec-butyl acetate, methoxybutyl acetate, 3-methoxybutyl acetate, 3-methoxy-3-methylbutyl acetate, ethyl-3-ethoxypropionate, amyl acetate, n-propyl acetate, isopropyl acetate, methyl lactate, ethyl lactate, butyl lactate, propylene glycol monomethyl ether acetate, propylene glycol monomethyl ether propionate, ethyl 3-ethoxypropionate, and dibasic acid ester (DBE).

Specific examples of ether include, but are not limited to, dimethyl ether, ethyl methyl ether, diethyl ether, ethylene oxide, tetrahydrofuran, furan, benzofuran, diisopropyl ether, methyl cellosolve, ethyl cellosolve, butyl cellosolve, 1,4-dioxane, methyl tert-butyl ether (MTBE), ethylene glycol dimethyl ether, diethylene glycol dimethyl ether, ethylene glycol diethyl ether, diethylene glycol diethyl ether, triethylene glycol dimethyl ether, diethylene glycol dibutyl ether, dipropylene glycol dimethyl ether, and dipropylene glycol monomethyl ether.

Specific examples of hydrocarbon include, but are not limited to, benzene, toluene, xylene, solvent naphtha, n-hexane, isohexane, cyclohexane, ethylcyclohexane, methylcyclohexane, cyclohexene, cycloheptane, cyclopentane, heptanes, pentamethylbenzene, pentanes, methylcyclopentane, n-Heptane, isooctane, n-decane, n-pentane, isopentane, mineral spirits, dimethylsulfoxide, and linear alkylbenzenes.

Specific examples of glycol include, but are not limited to, ethylene glycol, diethylene glycol, triethylene glycol, propylene glycol, and dimethoxytetraethylene glycol.

Specific examples of glycol ester include, but are not limited to, ethylene glycol monoethyl ether acetate and diethylene glycol monobutyl ether acetate.

Specific examples of glycol ether include, but are not limited to, methyl carbitol, ethyl carbitol, butyl carbitol, and methyl triglycol.

Specific examples of pyrrolidone include, but are not limited to, 2-pyrrolidone, N-ethyl-2-pyrrolidone, and N-methyl-2-pyrrolidone.

Specific examples of amide include, but are not limited to, dimethylformamide, dimethylacetamide, and formamide.

Specific examples of amine include, but are not limited to, tetramethylethylenediamine, N,N-diisopropylethylamine, ethylenediamine, triethylamine, diethylamine, aniline, pyrrolidine, piperidine, morpholine, pyrrole, pyridine, pyridazine, oxazole, thiazole, and 1,3-dimethyl-2-imidazolidinone.

Specific examples of carbonic acid ester include, but are not limited to, diethyl carbonate, dimethyl carbonate, propylene carbonate, and ethyl methyl carbonate.

Examples of the other components in a remover include, but are not limited to, surfactants, defoaming agents, preservatives and fungicides, corrosion inhibitors, and pH regulators.

Drying

In the drying, the liquid components such as a remover remaining in a green object are removed with a drying device by drying the green object.

Organic matter may be also removed during the drying in addition to the liquid components such as a remover in a green object.

The drying device is not particularly limited and can be suitably selected to suit to a particular application. The device includes, but is not limited to, a known drier or an environmental experiment chamber.

Degreasing

In the degreasing, a green object is heated by a degreasing device to form a degreased object from which resin is removed.

"The degreased object" means a solid object obtained by degreasing organic components such as the resin mentioned above from a green object.

In the degreasing, the organic components such as the resin mentioned above are decomposed and removed by heating a green object for a particular time (for example, 1 to 10 hours) at the thermal decomposition temperature of the organic components or higher than that and temperatures lower than the melting point or solidus temperature (for example, about 570 degrees C. for $AlSi_{10}Mg$ particles) of the materials (metal) constituting the metal particles using a degreasing device.

The degreasing device is not particularly limited and can be suitably selected to suit to a particular application. Examples include, but are not limited to, a known sintering furnace and an electric furnace.

Sintering

In the sintering, a degreased object formed by degreasing is heated with a sintering device to form a sintered compact "The sintered compact" means a solid object formed by integrating metallic materials constituting metal particles as inorganic particle and the sintered compact is obtained by sintering a degreased object.

In the sintering, the metallic materials constituting metal particles as inorganic particles are integrated by heating a degreased object for a particular time (for example, 1 to 10 hours) at the solidus temperature (for example, about 570° C. for $AlSi_{10}Mg$ particles) of the metallic materials or higher than that and at the liquidus temperature of the metallic materials (for example, about 600° C. for $AlSi_{10}Mg$ particles) and lower than that using a sintering device.

The sintering device is not particularly limited and can be suitably selected to suit to a particular application. Examples of the sintering device include, but are not limited to, the same as those for degreasing. The degreasing and the sintering may be conducted continuously.

Post-Processing

The method of manufacturing a fabrication object preferably includes post-processing a sintered compact. The post-processing is not particularly limited and can be suitably selected to suit to a particular application. Examples are a surface protection treatment and a painting treatment.

The surface protection treatment is to form a protection layer on a solid freeform fabrication object (green object) of a laminate of solidified matter formed during forming solidified matter. Due to this surface protection treatment, the surface of solidified matter is durable enough to be used as is.

Specific examples of the protection layer include, but are not limited to, a water-resistance layer, a weather resistance layer, a light resistance layer, a heat insulation layer, and a gloss layer.

Specific examples of the surface protection device include, but are not limited to, a known surface protection treatment device such as a spraying device and a coating device.

In the painting treatment, a solid freeform fabrication (green object) of a laminate of solidified matter formed during forming solidified matter is painted. Due to this painting, the green object is colored in a desired color.

A green object is painted by a known painting device such as a spray, a roller, and a brush.

Flow of Fabrication

The flow of fabrication in the method of manufacturing a fabrication object of the present disclosure is described with reference to FIGS. 3A to 3E. FIGS. 3A to 3E are schematic diagrams illustrating an operation of a device for manufacturing a fabrication object.

The device for manufacturing a fabrication object includes a supplying tank 21, a fabrication tank 22, and an extra powder receiving tank 29. The supplying tank 21 and the fabrication tank 22 respectively include a supply stage 23 and a fabrication stage 24, both of which are movable up and down. Powder 20 for solid freeform fabrication is disposed on the fabrication stage 24 provided to the fabrication tank 22. The powder 20 forms a layer 31 of powder formed of the powder 20.

Figure 3A:
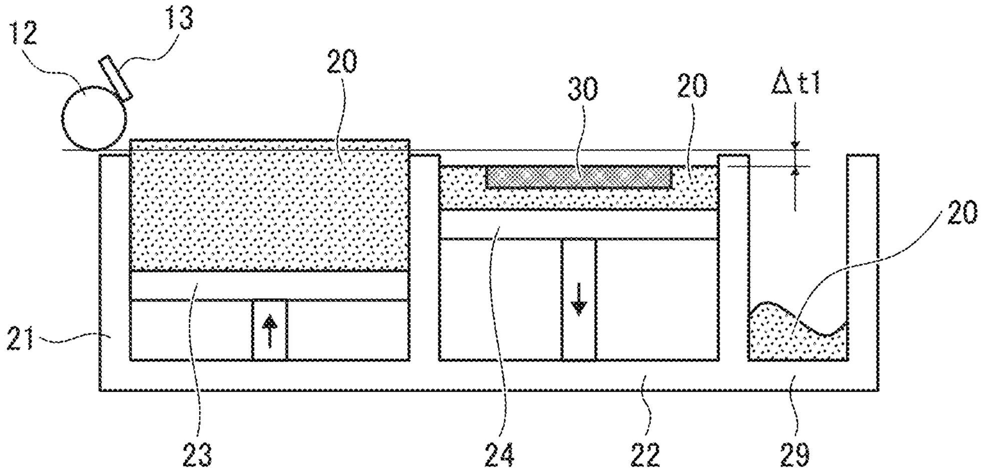
FIG. 3A is a diagram illustrating an operation of fabrication with a device for manufacturing a solid freeform fabrication object.

The description starts from the state in which the first layer of liquid fabrication applied layer 30 is formed on the fabrication stage 24 of the fabrication tank 22. When the next layer of powder containing inorganic particles is formed on the first layer of liquid fabrication applied layer 30, the supply stage 23 of the supply tank 21 is ascended and the fabrication stage 24 of the fabrication tank 22 is descended as illustrated in FIG. 3A. The descending distance of the fabrication stage 24 is determined in such a manner that the distance (lamination pitch) between the upper surface of the layer of powder at the fabrication tank 22 and the bottom part (bottom tangent portion) of a flattening roller 12 is Δt1. The length Δt1 is not particularly limited. It is preferably about several tens μm to about 100 μm.

The flattening roller 12 is disposed to have a gap to the upper surfaces of the supply tank 21 and the fabrication tank 22. Therefore, when the powder 20 containing inorganic particles is conveyed and supplied to the fabrication tank 22 followed by flattening, the upper surface of the layer of powder containing inorganic particles is situated at a position higher than the upper surface of the supply tank 21 and the fabrication tank 22. For this reason, the flattening roller 12 is absolutely prevented from contacting the upper surfaces of the supply tank 21 and the fabrication tank 22, thereby reducing damage to the flattening roller 12. If the flattening roller 12 is damaged on the surface, it produces streaks on the surface of the layer 31 of powder (FIG. 3D) supplied to the fabrication tank 22 so that the surface is likely to become rough. A powder removing plate 13 serving as a powder removing member for removing the powder 20 adhering to the flattening roller 12 is disposed abutting on the periphery of the flattening roller 12.

Figure 3B:
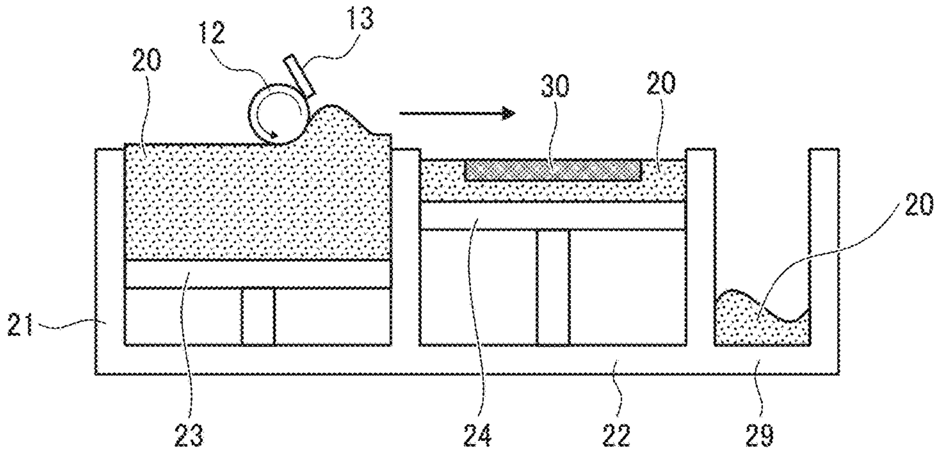
FIG. 3B is a diagram illustrating another operation of fabrication by a device for manufacturing a solid freeform fabrication object.
Figure 3C:
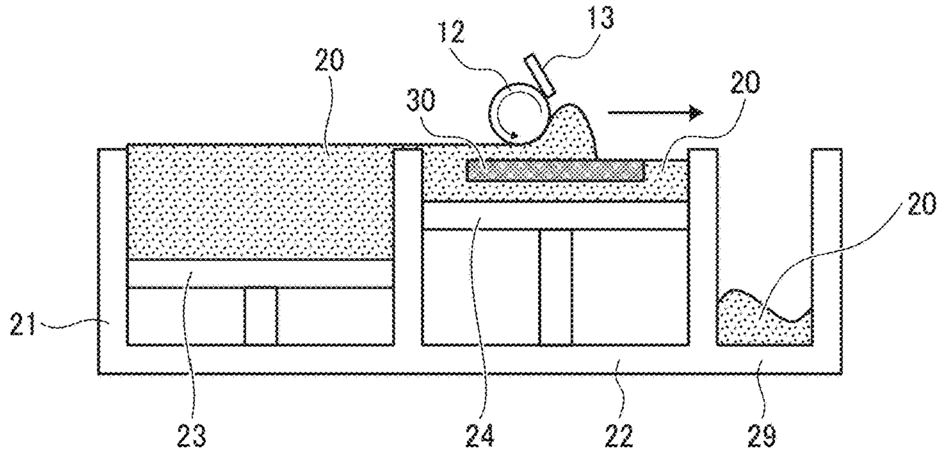
FIG. 3C is a diagram illustrating another operation of fabrication by a device for manufacturing a solid freeform fabrication object.
Figure 3D:
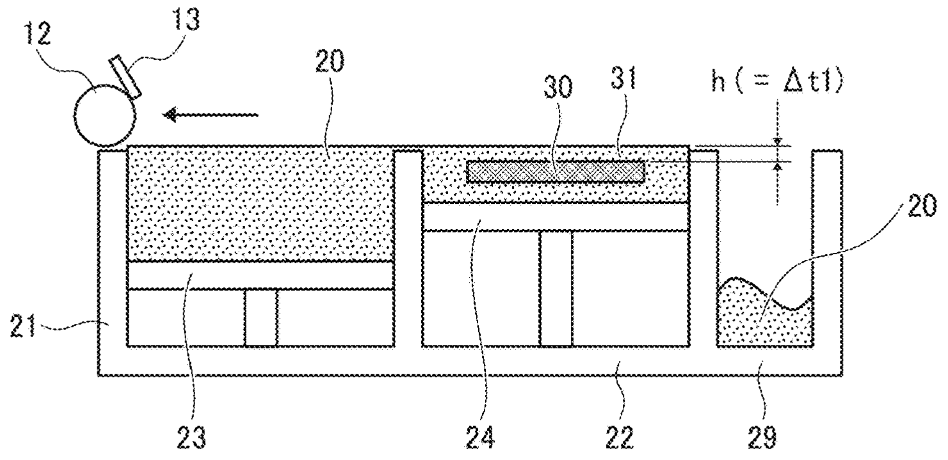
FIG. 3D is a diagram illustrating another operation of fabrication by a device for manufacturing a solid freeform fabrication object.

Thereafter, as illustrated in FIG. 3B, the powder 20 containing inorganic particles positioned above the upper surface of the supply tank 21 is moved to the side of the fabrication tank 22 by the flattening roller 12 rotating along the direction indicated by the arrow. Resultantly, the powder 20 containing inorganic particles is moved and supplied to the fabrication tank 22 (powder is supplied). Moreover, as illustrated in FIG. 3C, the flattening roller 12 is moved in parallel to the stage surface of the fabrication stage 24 of the fabrication tank 22 to form the layer 31 of powder having a predetermined thickness of Δt1 on the fabrication tank 22 of the fabrication stage 24 (the layer is flattened). At this point, the powder 20 containing extra inorganic particles not used for forming the layer 31 of powder drops in the extra powder receiving tank 29. After forming the layer 31 of powder, as illustrated in FIG. 3D, the flattening roller 12 is moved to the side of the supply tank 21 and back to the initial (original) position.

The flattening roller 12 moves while keeping the distance between the flattening roller 12 and the upper surface of both of the fabrication tank 22 and the supplying tank 21 constant. As the flattening roller 12 moves with this distance constant, the layer 31 of powder having a uniform thickness h (corresponding to the lamination pitch Δt1) can be formed on the fabrication tank 22 or the already-formed liquid fabrication applied layer 30 while the flattening roller 12 conveys the powder 20 onto the fabrication tank 22. The thickness h of the layer 31 of powder and the lamination pitch Δt1 are described without a distinction in some occasions. Unless otherwise specified, both have the same thickness and the same meaning. The thickness h of the layer 31 of power can be obtained by actual measuring. In such a measurement, the thickness h is preferably determined as the average of the results on multiple positions.

Figure 3E:
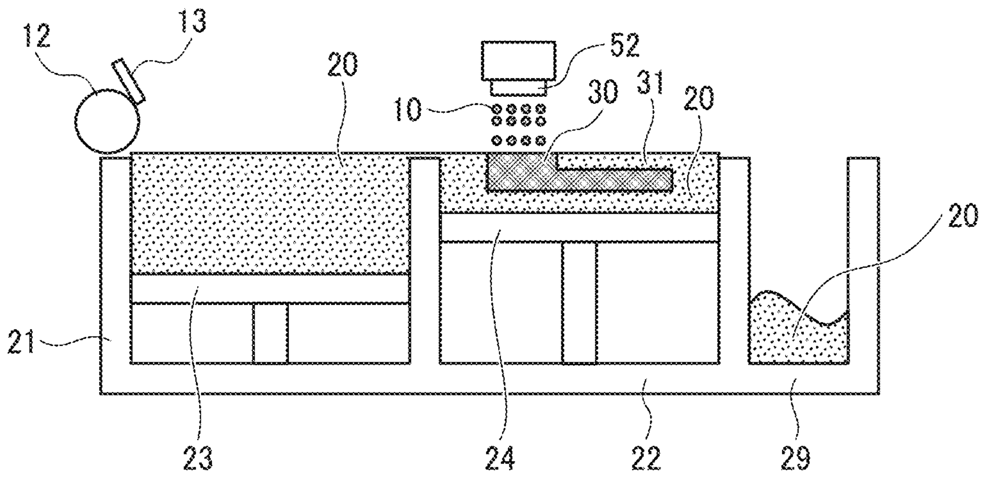
FIG. 3E is a diagram illustrating another operation of fabrication by a device for manufacturing a solid freeform fabrication object.

Thereafter, as illustrated in FIG. 3E, liquid droplets 10 of a liquid fabrication are discharged from a head 52 of the liquid discharging unit to form the liquid fabrication applied layer 30 having a target shape on the next layer 31 of powder. Next, another liquid fabrication applied layer 30 is laminated by forming a layer of powder and applying liquid fabrication described above again. This newly formed liquid fabrication applied layer 30 is integrated with the liquid fabrication applied layer 30 under the newly formed liquid fabrication applied layer 30 at this point. Thereafter, the layer forming and the liquid fabrication applying are repeated to complete a laminate.

Figure 4:
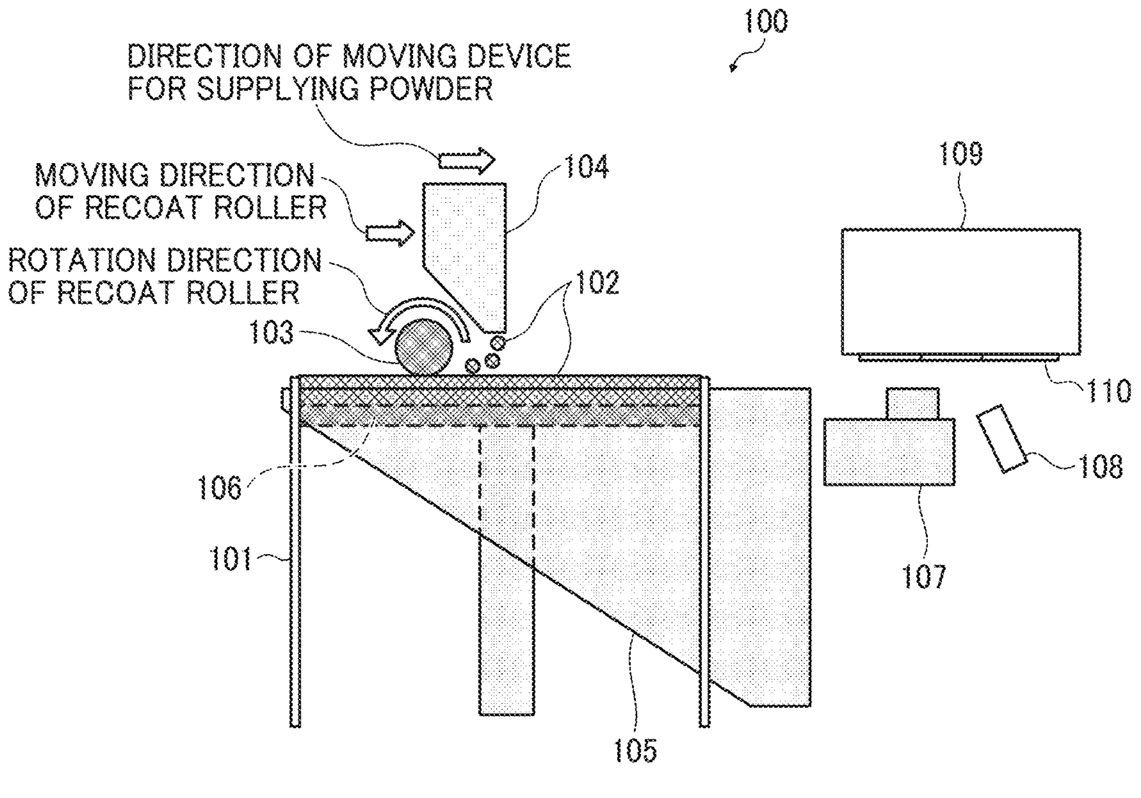
FIG. 4 is a diagram illustrating a front view from the side of the entire configuration of a device for manufacturing a solid freeform fabrication object.

FIG. 4 is a diagram illustrating a front view from the side of the entire configuration of a device 100 for manufacturing a solid freeform fabrication object. In the configuration illustrated in FIG. 4, a device 107 for detecting the state of the surface of a nozzle is an optical camera including a light source 108 disposed outside a fabrication tank 101. The device 100 for manufacturing a solid freeform fabrication object includes a recoat roller 103, an extra material receiver 105 for receiving extra material, and a fabrication plate 106 for laminating layers of powder. The recoat roller 103 may rotate in a direction different from the moving direction of a device 104 for supplying powder and the recoat roller 103.

One of the objectives of the device 107 is to detect whether liquid or a discharged medium 102 is blocking the nozzle. For this reason, the state of the nozzle is observed with the optical camera by a certain level of factor so that the observation field becomes narrow. Therefore, the entire, all the nozzles, of a discharging head 110 is not covered by a single observation. Thus, multiple images are taken with the optical camera to cover all the nozzles while the discharging head 110 scans the optical camera. Possibly, multiple optical cameras are disposed to take the entire image instead of scanning the discharging head 110. The surface of the nozzle can be observed not with an optical camera but with a device that can take an image in a solid form such as a laser displacement sensor. The light source accompanied with an optical camera may emit light having a wavelength to distinguish the nozzle surface from the discharged medium or can be disposed at an angled position. Moreover, it is possible to emit light with stripe patterns with widths to capture a discharged medium adhering to the surface of a nozzle with an optical camera three-dimensionally.

Figure 5:
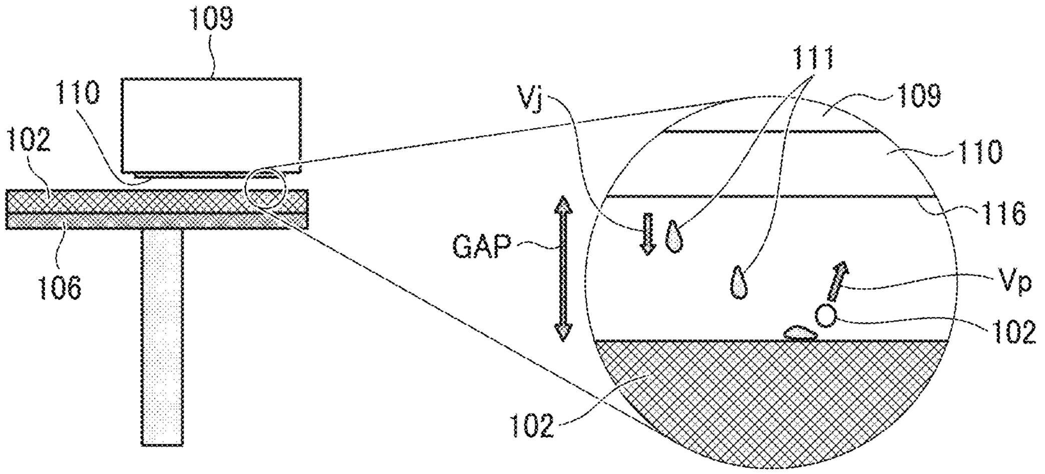
FIG. 5 is a diagram for describing the conditions under which a discharged medium adheres to the surface of a nozzle by discharging liquid droplets.

FIG. 5 is a diagram for describing the conditions under which the discharged medium 102 adheres to a surface 116 of a nozzle by discharging liquid droplets 111 of liquid fabrication.

The conditions under which the discharged medium 102 adheres to the surface 116 of a nozzle by discharging the liquid droplets 111 of liquid fabrication is described with reference to FIG. 5. Unlike FIG. 4, FIG. 5 is a diagram illustrating the state in which the discharging head 110 discharges to the discharged medium 102 in the fabrication tank. In addition, the state is enlarged in which the discharging head 110 is discharging the liquid droplets 111 of liquid fabrication to describe the condition under which the discharged medium 102 adheres to the surface 116 of a nozzle by discharging the liquid droplets 111 of liquid fabrication.

The liquid droplets 111 of liquid fabrication is discharged at a certain degree of speed to reach the discharged medium 102 with accuracy. The actual velocity vector of the liquid droplets 111 of liquid fabrication includes the discharging speed of Vj and the moving speed of Vc of a carriage 109. The liquid droplets 111 of liquid fabrication thus moves in a diagonal manner. This diagonal moving causes an error of the position the liquid droplets 111 of liquid fabrication reach by the fluctuation of the moving speed of the carriage 109 and the deviation of a discharging GAP of Dt between a surface 116 of a nozzle and the discharged medium 102. The impact of this deviation or error between Vc and Dt on the position of the liquid droplets 111 becomes small as Vj increases. As Vj increases, the time taken for the liquid droplets 111 to reach the position becomes short so that the impact of the air flow caused by the moving of the carriage 109 on the position becomes small. The discharging GAP of Dt is desired to be under a certain level according to the same reason as described above.

The size of Mj of the liquid droplets 111 of liquid fabrication is desired to be larger than a certain level to increase the productivity, speed, of laminating a solid object. As Mj increases, the impact of the air flow caused by the moving of the carriage 109 on the reaching position becomes small. The size (particle diameter) of powder is desired to be smaller than a certain level to enhance the resolution (such as surface property and precision) of a solid object.

Under such conditions, the powder is likely to adhere to the surface 116 of a nozzle. This adhesion causes defective discharging of liquid fabrication, which is found to degrade the reliability. The surface 116 is cleaned at this point. However, if the powder adhering to the surface 116 is wiped off with an instrument such as a wiper blade, the powder enters and clogs the nozzle. To the contrary, the surface 116 can be cleaned with a cleaning liquid without causing the powder to enter and clog the nozzle.

Figure 6:
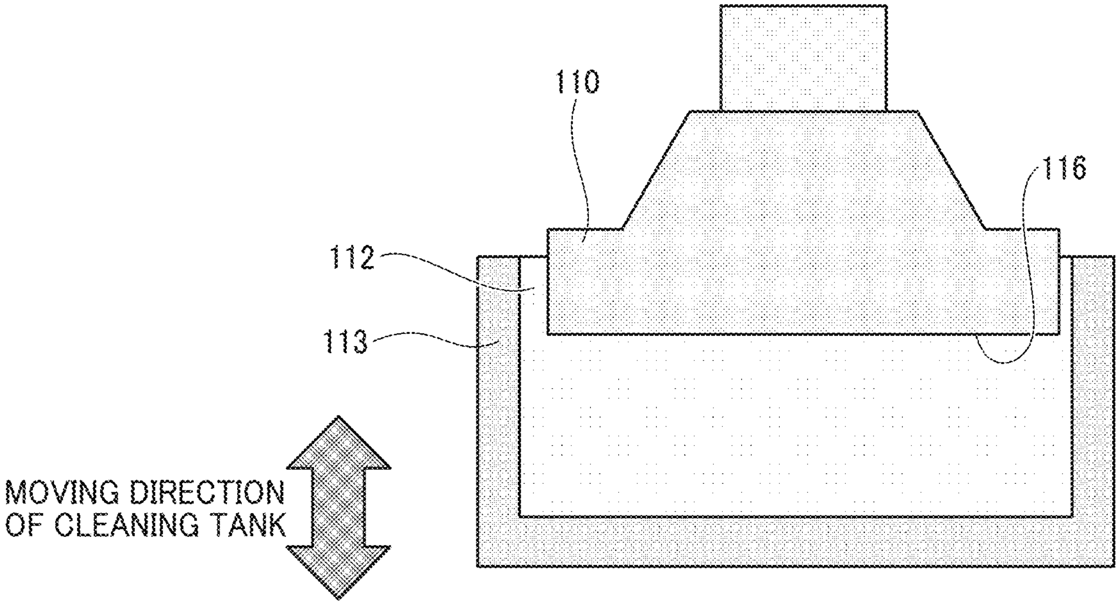
FIG. 6 is a diagram illustrating an example of dipping the surface of a nozzle in a cleaning liquid according to an embodiment of the present invention.
Figure 7:
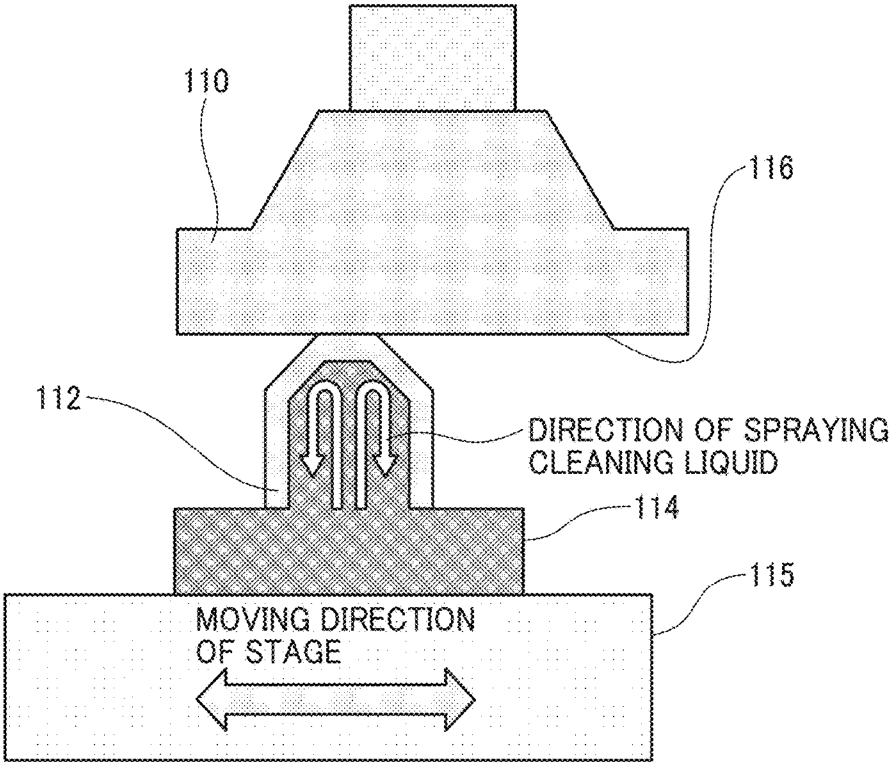
FIG. 7 is a photo illustrating an example of cleaning the surface of a nozzle with a cleaning liquid spraying mechanism according to an embodiment of the present invention.

FIGS. 6 and 7 are diagrams illustrating an example of cleaning maintenance using a cleaning liquid.

FIG. 6 is a diagram illustrating an example of dipping the surface of a nozzle in a cleaning liquid.

In the example of cleaning the surface 116 of a nozzle illustrated in FIG. 6, the surface 116 is dipped in a cleaning tank 113 filled with a cleaning liquid 112 to remove dirts.

In FIG. 6, the cleaning tank 113 filled with a cleaning liquid can move along the two-headed arrow in FIG. 6 and is moved up toward the surface 116 of a nozzle to dip the surface 116 in the cleaning liquid 112. This embodiment is just an example. Possibly, the surface 116 of a nozzle can be lowered to the cleaning tank 113.

Since the cleaning liquid 112 stored in the cleaning tank 113 is consumed in a large amount, the cleaning liquid 112 is regularly replaced.

The cleaning tank 113 is equipped with a device for applying an external force such as ultrasonic wave to enhance the cleaning performance.

The surface 116 may be wiped after cleaning with the cleaning liquid 112 to create the meniscus of a liquid fabrication.

FIG. 7 is a diagram for describing an embodiment in which the surface of a nozzle is cleaned with a mechanism for spraying a cleaning liquid to the surface of a nozzle.

FIG. 7 is a diagram illustrating an example of cleaning the surface 116 of a nozzle, in which the cleaning liquid 112 is sprayed to the surface 116 to remove dirts.

In the example illustrated in FIG. 7, the mechanism 114 for spraying a cleaning liquid disposed on a stage 115 sprays the cleaning liquid 112 along the curved arrows in FIG. 7 to clean the surface 116 of a nozzle.

The stage 115 can move along the two-headed arrow in FIG. 7 and moves to apply the cleaning liquid 112 to the entire of the surface 116 of a nozzle.

This embodiment is just an example. A mechanism for spraying a cleaning liquid that covers the entire surface of a nozzle can be employed.

The mechanism 114 for spraying a cleaning liquid may employ a hydraulic head difference or a pump.

The surface 116 may be wiped after cleaning with the cleaning liquid 112 to create the meniscus of a liquid fabrication.

Since the surface 116 of a nozzle is treated with water-repelling, the cleaning liquid 112 is likely to form a droplet.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Examples 1 to 19 and Comparative Examples 1 to 6

Preparation of Liquid Fabrication

The materials shown in Tables 1 to 5 were mixed and stirred at 80° C. with a magnetic stirrer for two hours. After the stirring for two hours, the mixture was cooled down to the room temperature, 25° C., while being stirred to prepare the liquid fabrications of Examples 1 to 19 and Comparative Examples 1 to 6.

The proportion of each of the individual materials shown in Tables 1 to 5 are represented in percent by mass. Each proportion does not represent the solid portion but the entire content, The property values of each liquid fabrication obtained were measured in the following manner. The results are shown in Tables 1 to 5.

Viscosity η of Liquid Fabrication

The viscosity η of each liquid fabrication was measured at 25° C. with a cone plate rotary viscometer (VISCOMETER TV-25, manufactured by TOKI SANGYO CO., LTD.).

Surface Tension γ of Liquid Fabrication

The surface tension γ of each liquid fabrication at 23° C. was measured with an automatic surface tensiometer DY-300, manufactured by Kyowa Interface Science Co., Ltd. according to Wilhelmy method (hanging plate method).

Contact Angle θn (Plate Method)

The contact angle θn between each liquid fabrication and a metal plate was measured at 25° C. by a droplet method using an instrument such as a contact angle meter DMs-301, manufactured by Kyowa Interface Science Co., Ltd.

As the metal plate, an aluminum free plate A 6061 LNQ-25-10-5, manufactured by MISUMI Group Inc., was used. A syringe was filled with a liquid fabrication. A droplet of about 2.0 microliters was added dropwise onto a metal plate using an automatic droplet forming feature to obtain a value by a θ/2 method from the shape of a droplet 20 seconds later, which was determined as the contact angle θn (plate method).

Powder Contact Angle θ

The powder contact angle θ between the liquid fabrication and inorganic particles was measured by using an automatic surface tensiometer DY-500, manufactured by Kyowa Interface Science Co., LTD.

Powdered aluminum (ALSI3-30B, manufactured by Toyo Aluminium K.K.) was used as the powder containing inorganic particles.

The column was filled with 5 g of powder containing inorganic particles. The porosity was adjusted by a powder compressor to the range of from 35.6 to 35.8 percent by mass.

Acetone was used as a liquid having a wettability good enough to the powder containing the inorganic particles. The capillary radius was obtained assuming that the powder contact angle θ of acetone was 0 degrees. "Capillary radius" means a radius of a gap between inorganic particles when metal particles are packed in a column. The radius was measured by an automatic surface tensiometer DY-500, manufactured by Kyowa Interface Science Co., LTD.

Subsequently, the speed of the liquid fabrication penetrating the powder containing inorganic particles was measured by using an automatic surface tensiometer DY-500, manufactured by Kyowa Interface Science Co., Ltd., in the range of from 150 to 180 seconds from the start of the measurement. The speed of the liquid fabrication penetrating the powder containing the inorganic particles is represented by the Lucas-Washburn equation of the following Mathematical Formula 1.

$$\frac{l(t)_{wetted}^2}{t} = \frac{r\gamma\cos\theta}{2\eta} \qquad \text{Mathematical Formula 1}$$

In Mathematical Formula 1, $l(t)_{wetted}$ represents the penetration distance of a liquid fabrication at the time t, t represents the measurement time, r represents the average capillary radius, γ represents the surface tension of the shaping liquid at 23° C., θ represents the powder contact angle of the liquid fabrication with the inorganic particle, and η represents the viscosity of the liquid fabrication at 25° C.

The powder contact angle θ of the liquid fabrication with the inorganic particle was calculated from the capillary radius, the speed of penetration, the viscosity γ of the liquid fabrication at 25° C., and the surface tension η of the liquid fabrication at 23° C. based on Mathematical Formula 1. The liquid fabrication was subjected to measuring three times and the smallest powder contact angle θ was adopted.

$$\gamma\cos\theta/\eta$$

γcosθ/η was calculated as an index for the penetration speed. θ represents the powder contact angle, γ represents the surface tension in mN/m of the liquid fabrication at 23 degrees C., and η represents the viscosity in mPa·s of the liquid fabrication at 25° C.

Method of Manufacturing Fabrication Object

Each liquid fabrication and powdered aluminum (ALSI3-30B, manufactured by Toyo Aluminium K.K.) as inorganic particles were subjected to additive manufacturing to obtain each fabrication object.

1. The powdered aluminum was moved from the supply tank 21 to the fabrication tank 22 using a device for manufacturing a fabrication object as illustrated in FIGS. 3A to 3E to form a thin layer of the powdered aluminum having an average thickness of 84 μm on the fabrication stage 24.

2. Next, the inkjet discharging head (industrial RICOH MH5421, manufactured by Ricoh Co., Ltd.) in a device for manufacturing a fabrication object discharged each liquid fabrication from the nozzle to the surface of the thin layer of powdered aluminum formed. The amount of the liquid fabrication was 140 pico litter in resolution conversion of 300 dpi per layer. The discharging region of the liquid fabrication was a rectangle of 54 mm×10 mm and a rectangle of 28 mm×10 mm.

3. Thereafter, the operations 1 and 2 mentioned above were repeated to sequentially laminate thin layers of powdered aluminum until the rectangle of 54 mm×10 mm had a total average thickness of 2 mm and the rectangle of 28 mm×10 mm had a total average thickness of 3 mm, thereby forming a laminate (laminating process).

4. Subsequently, the laminate was heated and dried in vacuum to obtain solidified matter (heating process).

5. The solidified matter obtained was subjected to air blowing to remove extra powder (process of removing extra powder).

The fabrication object of the rectangle of 54 mm×10 mm was used for evaluation on the dimensional accuracy and the fabrication object of the rectangle of 28 mm×10 mm was used for evaluation on the bending strength.

Evaluation on Dimensional Accuracy

The dimensions of each fabrication object of the rectangle of 54 mm×10 mm were measured with a caliper to evaluate the dimensional accuracy according to the following evaluation criteria.

Evaluation Criteria

S: The error of the actual dimension based on the dimension of fabrication data is 0.5 mm or less with a clear contour A: The error of the actual dimension based on dimension of the fabrication data is 0.5 mm or less with a slightly blurred contour and exudation portions appear (however, the exudation portion can be removed in the process of removing extra powder)

C: The error of the actual dimension based on the dimension of the fabrication data is greater than 0.5 mm and exudation portions appear (the exudation portion is not readily removed in the process of removing extra powder)

Evaluation on Bending Strength

The bending strength of each obtained fabrication object of the rectangle of 28 mm×10 mm was measured with a universal tester autograph AG-I, manufactured by Shimadzu Corporation. Specifically, using a 1 kN load cell and a three-point bending jig, the stress was plotted against distortion when each fabrication object was displaced with a distance between the fulcrums of 24 mm at a speed of the load point of 1 mm/minute. The stress at breakage was determined as the breaking stress (Mpa) and was evaluated according to the following evaluation criteria.

Evaluation Criteria

S: 5 MPa or greater

A: from 3 to less than 5 MPa

C: Less than 3 MPa

Evaluation on Dischargeability

The inkjet discharging head (industrial inkjet RICOH MH5421, manufactured by Ricoh Co., Ltd.) in the device for manufacturing a fabrication object for use in fabrication discharged each liquid fabrication from nozzles by 100 cycles of discharging for 3 seconds and non-discharging for 10 second under the discharging condition of 2 kHz and 24 kHz. The number of nozzles failing to discharging was counted per 100 nozzles to evaluate the dischargeability according to the following evaluation criteria.

Evaluation Criteria

S: the number of nozzles that failed to discharge is 2 or less at 2 kHz and 24 kHz discharging A: the number of nozzles that failed to discharge is 2 or less at 2 kHz discharging but the number is greater than 2 at 24 kHz discharging C: the number of nozzles that failed to discharge is greater than 2 at 2 kHz and 24 kHz discharging

TABLE 1

| | | | Example | | | | | Comparative |
|---|---|---|---|---|---|---|---|---|
| | | | 1 | 2 | 3 | 4 | 5 | Example 1 |
| Prescription of liquid fabrication | Resin | Type | A | A | A | A | A | A |
| | | Proportion (percent by mass) | 14.40 | 13.35 | 10.00 | 8.90 | 6.40 | 4.50 |
| | Organic solvent | Type | triglyme | triglyme | triglyme | triglyme | triglyme | triglyme |
| | | Proportion (percent by mass) | 85.56 | 86.61 | 89.96 | 91.06 | 93.56 | 95A6 |

TABLE 1-continued

| | | | Example | | | | | Comparative Example 1 |
|---|---|---|---|---|---|---|---|---|
| | | | 1 | 2 | 3 | 4 | 5 | |
| | Surfactant | Type | S-693 | S-693 | S-693 | S-693 | S-693 | S-693 |
| | | Proportion (percent by mass) | 0.04 | 0.04 | 0.04 | 0.04 | 0.04 | 0.04 |
| fabrication Property of liquid | Viscosity at 25 degrees C. | mPa · S | 21.0 | 18.3 | 12.2 | 9.6 | 6.5 | 4.7 |
| | Surface tension at 23 degrees C. | mN/m | 23.4 | 24.4 | 24.2 | 24.2 | 24.2 | 22.9 |
| | Contact angle θn (plate method) | Degrees | 8.5 | 7.3 | 6.8 | 6.5 | 6.9 | 63 |
| | Powder contact angle θ | Degrees | 61.0 | 623 | 64.5 | 67.1 | 623 | 69.3 |
| | γcosθ/η | m/s | 0.5 | 0.6 | 0.9 | 1.0 | 1.4 | 1.7 |
| Evaluation result | Dimension accuracy | | S | S | S | S | A | C |
| | Bending strength | | S | S | S | A | A | C |
| | Dischargeability | | S | S | S | S | S | S |

TABLE 2

| | | | Comparative Example 2 | Example | | | | | |
|---|---|---|---|---|---|---|---|---|---|
| | | | | 6 | 7 | 8 | 9 | 10 | 11 |
| liquid fabrication Prescription of | Resin | Type | A | A | A | A | A | A | A |
| | | Proportion (percent by mass) | 13.35 | 13.35 | 13.35 | 13.35 | 13.35 | 13.35 | 13.35 |
| | Organic solvent | Type | triglyme | triglyme | triglyme | triglyme | triglyme | triglyme | triglyme |
| | | Proportion (percent by mass) | 86.65 | 86.645 | 86.64 | 86.63 | 86.55 | 8635 | 86.15 |
| | Surfactant | Type | S-693 | S-693 | S-693 | S-693 | S-693 | S-693 | S-693 |
| | | Proportion (percent by mass) | 0 | 0.005 | 0.01 | 0.02 | 0.1 | 03 | 0.5 |
| Property of liquid fabrication | Viscosity at 25 degrees C. | mPa · S | 18.3 | 18.2 | 18.2 | 183 | 183 | 18.3 | 18.4 |
| | Surface tension at 23 degrees C. | mN/m | 32.0 | 30.5 | 283 | 25.8 | 22.0 | 21.0 | 20.6 |
| | Contact angle θn (plate method) | Degrees | 8.3 | 8.5 | 8.0 | 7.5 | 5.9 | 6.2 | 6..0 |
| | Powder contact angle θ | Degrees | 31.1 | .503 | 52.5 | 64.2 | 62.5 | 63.0 | 69.9 |
| | γcosθ/η | m/s | 1.5 | 1.1 | 0.9 | 0.6 | 0.6 | 0.5 | 0.4 |
| Evaluation result | Dimension accuracy | | C | A | S | S | S | S | S |
| | Bending strength | | S | S | S | S | S | S | S |
| | Dischargeabi lity | | S | S | S | S | S | A | A |

TABLE 3

| | | | Comparative Example | | | |
|---|---|---|---|---|---|---|
| | | | 3 | 4 | 5 | 6 |
| Prescription of liquid fabrication | Resin | Type | A | A | A | A |
| | | Proportion (percent by mass) | 13.35 | 13.35 | 13.35 | 13.35 |
| | Organic solvent | Type | triglyme | triglyme | triglyme | triglyme |
| | | Proportion (percent by mass) | 86.45 | 86.50 | 86.616 | 86.6415 |
| | Surfactant | Type | BYK333 | BYK378 | S-611 | S-647 |
| | | Proportion (percent by mass) | 0.2 | 0.15 | 0.034 | 0.0085 |
| Property of liquid fabrication | Viscosity at 25 degrees C. | mPa · S | 18.3 | 18.3 | 18.3 | 18.4 |
| | Surface tension at 23 degrees C. | mN/m | 24.0 | 24.1 | 24.2 | 24.8 |
| | Contact angle θn (plate method) | Degrees | 6.0 | 12.0 | 6.5 | 6.3 |
| | Powder contact angle θ | Degrees | 37.6 | 33.2 | 41.4 | 48.0 |
| | γcosθ/η | m/s | 1.0 | 1.1 | 1.0 | 0.9 |
| Evaluation result | Dimension accuracy | | C | C | C | C |
| | Bending strength | | A | A | A | A |
| | Dischargeability | | S | S | S | S |

TABLE 4

| | | | Example | | |
|---|---|---|---|---|---|
| | | | 12 | 13 | 14 |
| Prescription of liquid fabrication | Resin | Type | A | A | B |
| | | Proportion (percent by mass) | 10.90 | 7.80 | 7.90 |
| | Organic solvent | Type | DESU | TG/TAc | triglyme |
| | | Proportion (percent by mass) | 89.06 | 92.16 | 92.06 |
| | Surfactant | Type | S-693 | S-693 | S-693 |
| | | Proportion (percent by mass) | 0.04 | 0.04 | 0.04 |

TABLE 4-continued

| | | | Example | | |
|---|---|---|---|---|---|
| | | | 12 | 13 | 14 |
| Property of liquid fabrication | Viscosity at 25 degrees C. | mPa · s | 18.1 | 18.1 | 18.1 |
| | Surface tension at 23 degrees C. | mN/m | 22.9 | 23.1 | 24.2 |
| | Contact angle θn (plate method) | Degrees | 8.2 | 10.1 | 7.7 |
| | Powder contact angle θ | Degrees | 75.4 | 56.9 | 68.8 |
| | γcosθ/η | m/s | 0.3 | 0.7 | 0.5 |
| Evaluation result | Dimension accuracy | | S | S | S |
| | Bending strength | | S | S | S |
| | Dischargeability | | S | S | S |

TABLE 5

| | | | Example | | | | |
|---|---|---|---|---|---|---|---|
| | | | 15 | 16 | 17 | 18 | 19 |
| Prescription of liquid fabrication | Resin | Type | A | A | A | A | A |
| | | Proportion (percent by mass) | 13.35 | 13.35 | 1335 | 1335 | 13.35 |
| | Organic solvent | Type | | | | | |
| | | Proportion | triglyme | triglyme | triglyme | triglyme | triglyme |
| | | (percent by mass) | 86.64 | 86.62 | 86 A 5 | 86.62 | 86.15 |
| | Surfactant | Type | | | | | |
| | | Proportion | | | | | |
| | | (percent by | SAG020 | SAG020 | SAG020 | KF353 | KF353 |
| | | mass) | 0.01 | 0.03 | 0.5 | 0.03 | 0.5 |

TABLE 5-continued

| | | | Example | | | | |
|---|---|---|---|---|---|---|---|
| | | | 15 | 16 | 17 | 18 | 19 |
| | Resin | Type<br>Proportion (percent by | | | | | |
| Property of liquid fabrication | Viscosity at 25 degrees C. | mPa · S | 18.2 | 18.2 | 18.4 | 18.2 | 18.4 |
| | Surface tension at 23 degrees C. | mN/m | 28.0 | 25.9 | 24.0 | 28.0 | 26.1 |
| | Contact angle θn (plate method) | Degrees | 9.2 | 8.8 | 8.7 | 9.5 | 9.3 |
| | Powder contact angle θ | Degrees | 50.6 | 57.3 | 61.0 | 553 | 62.7 |
| | γcosθ/η | m/s | 1.0 | 0.8 | 0.6 | 0.9 | 0.7 |
| Evaluation result | Dimension accuracy | | S | S | S | S | S |
| | Bending strength | | S | S | S | S | S |
| | Dischargeability | | S | S | S | S | S |

The details of each material in Tables 1 to 5 are as follows.

Resin

Resin A: Partially saponidied polyvinyl acetate resin, JMR-10LL, manufactured by JAPAN VAM & POVAL CO., LTD.

Resin B: polyvinyl butyral resin, S-LEC BL-10, manufactured by SEKISUI CHEMICAL CO., LTD.

Organic Solvent triglyme: triethylene glycol dimethyl ether, manufactured by SANKYO CHEMICAL CO., LTD.

DESU: diethyl succinate, manufactured by Tokyo Chemical Industry Co. Ltd.

TG/Tac: a mixture of triglyme, manufactured by SANKYO CHEMICAL CO., LTD. and triacetin, manufactured by Tokyo Chemical Industry Co. Ltd. at a mass ratio of 60:40

Surfactant

S-693: Surflon S-693, fluorochemical surfactant, manufactured by AGC SEIMI CHEMICAL CO., LTD.

BYK333: BYK333, silicone-based surfactant, manufactured by BYK Japan KK

BYK378, silicone-based surfactant, manufactured by BYK Japan KK

S-611: Surflon S-611, fluorochemical surfactant, manufactured by AGC SEIMI CHEMICAL CO., LTD.

S-647: Surflon S-647, fluorochemical surfactant, manufactured by AGC SEIMI CHEMICAL CO., LTD.

SAG020: Silface SAG020, silicone-based surfactant, manufactured by Nissin Chemical co., ltd.

KF353: Fluorochemical surfactant, manufactured by Shin-Etsu Chemical Co., Ltd.

In Table 1, the liquid fabrications were prepared in Examples 1 to 5 and Comparative Example 1 while changing the proportions of the resin.

As the proportion of the resin decreases, the viscosity of the liquid fabrication at 25 degrees C. was found to decrease, the penetration was found to occur quickly (γcosθ/η increased), and the bending strength of the fabrication object was found to decrease.

When γcosθ/η is 1.5 or less, the dimensional accuracy was found to be good. When γcosθ/η is 1 or less, the dimensional accuracy was found to be better.

When the viscosity of a liquid fabrication at 25° C. was 6 Mpa·s or greater, the bending strength of the liquid fabrication was found to be good. When the viscosity of a liquid fabrication at 25° C. was 12 Mpa·s or greater, the bending strength of the liquid fabrication was found to be better.

In Table 2, the liquid fabrications were prepared in Examples 6 to 11 and Comparative Example 2 while changing the proportions of the surfactant.

The liquid fabrication free of a surfactant was found to have a small powder contact angle θ, thereby degrading the dimensional accuracy of the fabrication object.

The liquid fabrication containing a surfactant was found to have a large powder contact angle θ. The liquid fabrication containing a large amount of a surfactant was found to tend to have a large powder contact angle θ. The dimensional accuracy of a fabrication object was found to be good at a powder contact angle θ of 50 degrees or greater. A γcosθ/η of 1.0 or less was found to further enhance the dimensional accuracy.

When the surface tension of a liquid fabrication at 23° C. was 22 mN/m or greater, the discharging performance of the liquid fabrication was found to be excellent.

In Tables 3 and 5, the liquid fabrications were prepared in Examples 15 to 19 and Comparative Examples 3 to 6 while changing the type of the surfactant.

Each of the surfactants of BYK333, BYK378, S-611, and S-647 of Comparative Examples 3 to 6 had a powder contact angle θ of less than 50 degrees and was found to degrade the dimensional accuracy.

For each of the surfactants of Examples 15 to 19, which were SAG020 and KF353, the dimensional accuracy, bending strength, and discharging performance were found to be good.

In Table 4, the liquid fabrications were prepared in Examples 12 and 13 while changing the type of the organic solvent. For each of the organic solvents (DESU and TG/TAc) of Examples 12 and 13, the dimensional accuracy, bending strength, and discharging performance were found to be good.

In Table 4, the liquid fabrication was prepared in Example 14 using a different type of resin. For the resin (resin B) of Example 14, the dimensional accuracy, bending strength, and discharging performance were found to be good.

Amount of Liquid Fabrication Applied

In Example 2, the amount of the liquid fabrication applied was changed by adjusting the volume of the liquid fabrication per droplet of a nozzle, the resolution, or the number of droplets added per voxel. The fabrication objects No. 1 to No. 14 of a cuboid of 30 mm×10 mm×3 mm shown in Table 6 below were manufactured in the same manner as in Examples 1 to 19 and Comparative Examples 1 to 6.

Total Evaluation

Based on the evaluation results on the local exudation and the bending strength, the fabrication objects were totally evaluated according to the following evaluation criteria.

Evaluation Criteria

A: When both of local exudation and bending strength are graded A

B: When either local exudation or bending strength is graded B

C: When either or both of local exudation and bending strength are graded C

| | Amount of liquid fabrication added | | | | Bending strength | | |
|---|---|---|---|---|---|---|---|
| No. | Corresponding to 300 dpi | μL/ mm3 | Resolution (dpi) | Local exudation | Value (MPa) | Evaluation | Total evaluation |
| 1 | 4 | 0.007 | 600 | A | 0.00 | C | C |
| 2 | 20 | 0.033 | 600 | A | 0.55 | B | B |
| 3 | 36 | 0.059 | 600 | A | 1.64 | B | B |
| 4 | 54 | 0.089 | 600 | A | 1.69 | B | B |
| 7 | 72 | 0.119 | 600 | A | 2.00 | B | B |
| 6 | 90 | 0.148 | 600 | A | 3.14 | A | A |
| 7 | 100 | 0.165 | 600 | A | 3.53 | A | A |
| 8 | 160 | 0.263 | 600 | A | 5.70 | A | A |
| 9 | 171 | 0.282 | 600 | A | 6.30 | A | A |
| 10 | 200 | 0.330 | 600 | A | 7.26 | A | A |
| 11 | 210 | 0.346 | 600 | C | 7.64 | A | C |
| 12 | 240 | 0.395 | 600 | C | 8.80 | A | C |
| 13 | 160 | 0.263 | 1200 | A | 6.30 | A | A |
| 14 | 160 | 0.263 | 2400 | A | 6.50 | A | A |

Then the fabrication objects No. 1 to No. 14 were evaluated on the local exudation in the following manner and the bending strength of the objects was measured, followed by total evaluation. The results are shown in Tables 6 and 2.

Evaluation on Local Exudation

Each fabrication object of a cuboid of 30 mm×10 mm×3 mm was visually observed about whether the portion referred to as exudation was present and evaluated according to the following criteria. The local exudation is larger than the target dimensions and appears on the side. This is because the liquid fabrication applied layer is pressed when a flattening roller conveys the powder to a fabrication tank, thereby the liquid fabrication spreading to the surface of powder. Such local exudation does not create a problem for a product because it can be readily removed by an impact at removing powder around a fabrication object.

Evaluation Criteria

A: Local exudation not found

B: Local exudation found

Bending Strength

The bending strength of each fabrication object of a cuboid of 30 mm×10 mm×3 mm was measured with a universal tester autograph AG-I, manufactured by Shimadzu Corporation.

Specifically, using a 1 kN load cell and a three-point bending jig, the stress was plotted against distortion when each fabrication object was displaced with a distance between the fulcrums of 24 mm at a speed of the load point of 1 mm/minute. The stress at breakage was determined as the breaking stress (Mpa) and was evaluated according to the following evaluation criteria.

Evaluation Criteria

A: 3 Mpa or greater

B: 0.5 to 3 MPa

C: Less than 0.5 MPa

Figure 2:
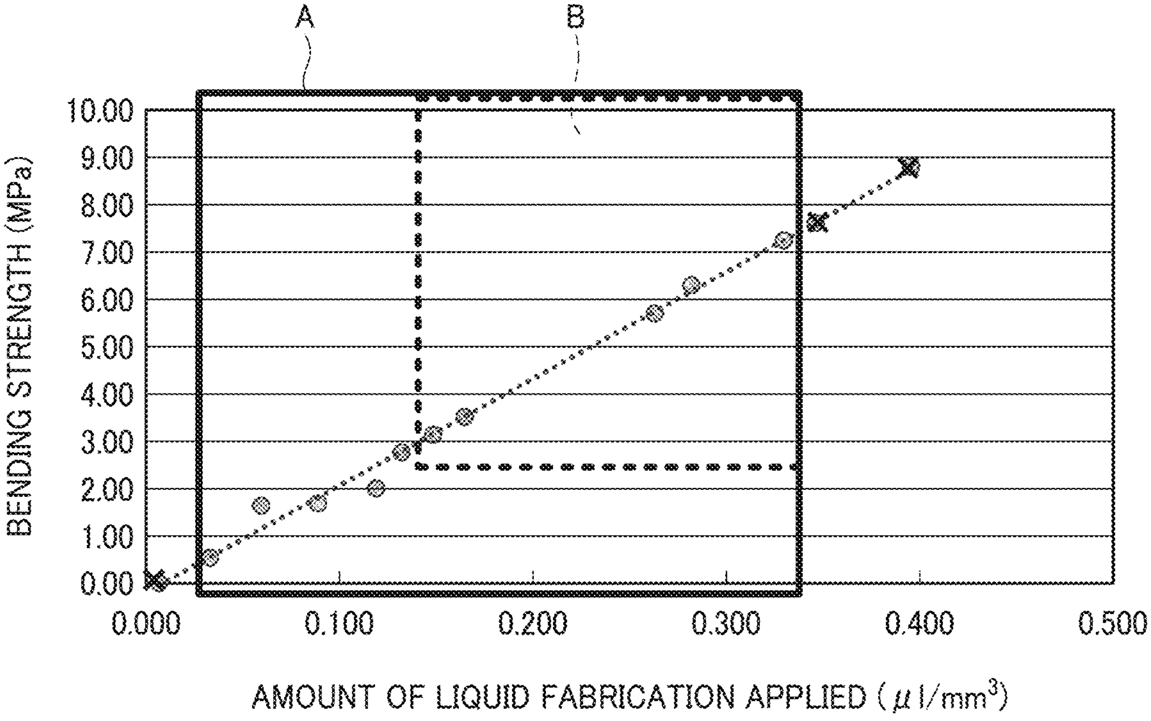
FIG. 2 is a graph illustrating the relationship between the amount of liquid fabrication applied and the bending strength of a fabrication object.

As seen in the results shown in Table 6 and FIG. 2, an amount of liquid fabrication applied of from 0.033 to 0.33 $\mu L/mm^3$ as in the range A of the graph of FIG. 2 was found to create space enough for each liquid droplet to ooze to the both sides thereof when a liquid fabrication applied layer was pressed during the conveyance of powder to the upper portion of a fabrication tank by a flattening roller, thereby preventing local exudation of the liquid fabrication. An amount of a liquid fabrication applied of less than 0.033 $\mu L/mm^3$ was found to collapse a fabrication object.

In addition, in the range B of the graph of FIG. 2 of from 0.148 to 0.33 $\mu L/mm^3$, the amount of resin for supporting a fabrication object was found to increase, thereby enhancing the bending strength of the fabrication object to 3 Mpa or greater. A fabrication object having a bending strength of 3 Mpa or greater does not break when the fabrication object is a cuboid of 30 mm×10 mm×3 mm and falls from a height of 100 mm.

Evaluation on Cleaning

During cleaning, a cleaning liquid may be sucked in a nozzle while the cleaning liquid is being applied to the surface of the nozzle. Resultantly, the liquid fabrication in the nozzle may be mixed with the cleaning liquid. Mixing of a liquid fabrication with a cleaning liquid is referred to as color mixing. In the cleaning, the mechanism for spraying a cleaning liquid to the surface of a nozzle illustrated in FIG. 9 was used. The cleaning liquid was triethylene glycol dimethyl ether.

Figure 8A:
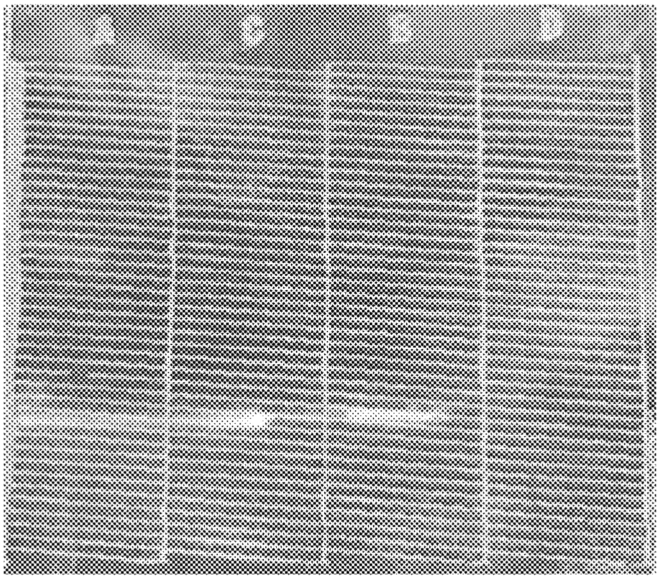
FIG. 8A is a photo illustrating a good state free of color mixing, in which the discharged line is free of blurring.
Figure 8B:
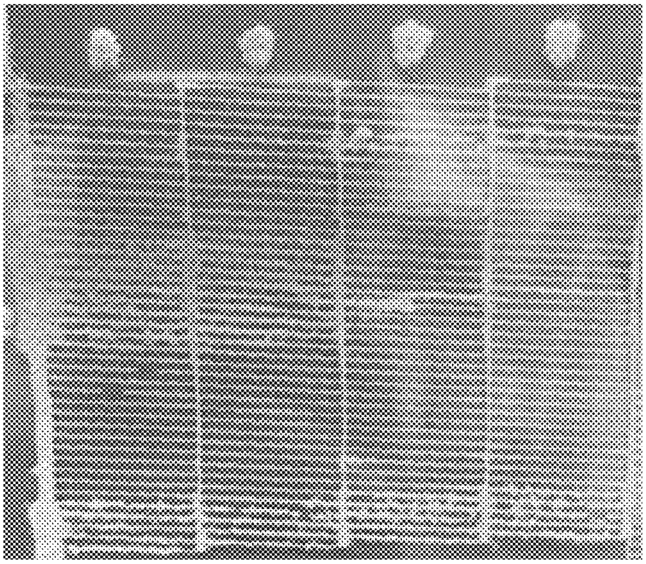
FIG. 8B is a photo illustrating a state of color mixing, in which blurring of discharged lines are present.
Figure 8C:
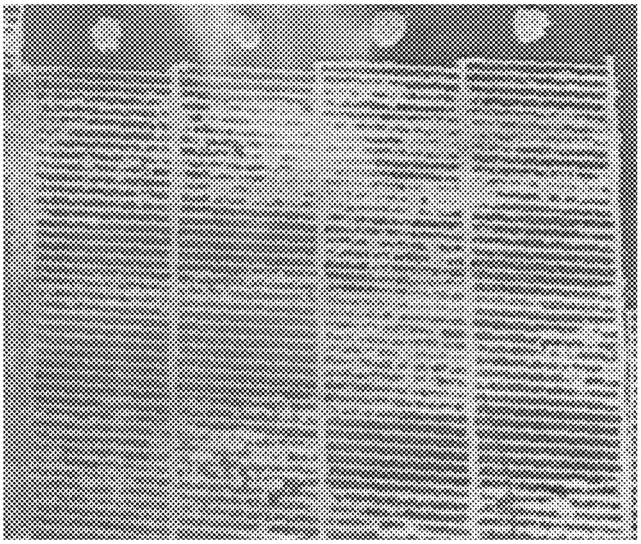
FIG. 8C is a photo illustrating a bad state of color mixing, in which significant blurring of discharging is present.

The liquid fabrication of Example 2 was discharged to a transparent sheet (VF-1420N, manufactured by KOKUYO CO., LTD.). Thereafter, powdered aluminum (ALSI3-30B, manufactured by Toyo Aluminium K.K.) was sprinkled to the transparent sheet to render the portions to which the liquid fabrication was discharged visible to obtain the patterns as illustrated in FIGS. 8A to 8C. The patterns were formed by powdered aluminum adhering to the portions to which the liquid fabrication was applied.

In a normal state as illustrated in FIG. 8A, the lines to which the liquid fabrication was discharged were clearly present. Conversely, the lines formed after the cleaning liquid was discharged blurred as illustrates in FIGS. 8B and 8C. This shows that the liquid fabrication reached outside the target position or a liquid droplet of the liquid fabrication was separated into multiple droplets before reaching the transparent sheet. Inferentially, during cleaning, the cleaning liquid mixed with the liquid fabrication in a nozzle changed the properties of the liquid fabrication, thereby destabilizing discharging, which caused these blurred lines. Such a change in the property of a liquid fabrication and unstable discharging thereof have an adverse impact on the quality such as the strength and the dimensional accuracy of a fabrication object.

To deal with this adverse impact, a pressure (also referred to as adjusted pressure) applied to a nozzle during cleaning was adjusted to avoid mixing of a liquid fabrication with a cleaning liquid.

Normally, a liquid fabrication present in a discharging head is under a suitable negative pressure, which is maintained to appropriately discharge the liquid fabrication from the discharging head. The normal negative pressure is from about −25 to −10 mmaq. In the present disclosure, the pressure (adjusted pressure) applied to a liquid fabrication in a discharging head is adjusted.

Figure 9:
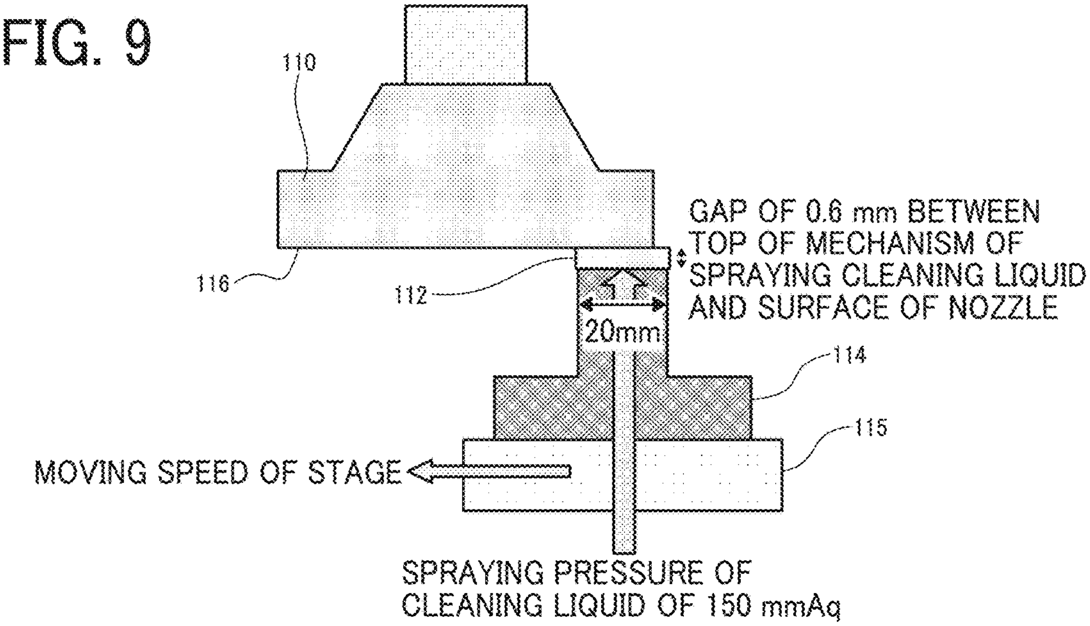
FIG. 9 is a schematic diagram illustrating an example of the mechanism for sprying a cleaning liquid to the surface of a nozzle used in Examples, which are described later.

Next, using the cleaning liquid of triethylene glycol dimethyl ether and the mechanism of spraying a cleaning liquid to the surface of a nozzle illustrated in FIG. 9, the surface was cleaned at a moving speed of the moving stage of 10 mm/s while changing the adjusted pressure as shown in Table 7. Thereafter, the liquid fabrication of Example 2 was discharged to a transparent sheet (VF-1420N, manufactured by KOKUYO CO., LTD.) and then powdered aluminum (ALSI3-30B, manufactured by Toyo Aluminium K.K.) was sprinkled to the sheet, followed by printing the patterns as illustrated in FIGS. 8A to 8C. The degree of blurring (color mixing) of the discharged lines were evaluated according to the following criteria. The results are shown in Table 7.

Evaluation Criteria

If the discharged line blurs as in FIG. 8B, the color mixing is graded as B. If the discharged line significantly blurs as in FIG. 8C, the color mixing is graded as C. If the discharged line does not blur as in FIG. 8A, color mixing is graded as A.

TABLE 7

| Adjusted pressure | −25 mmaq | −10 mmaq | 0 mmaq | 10 mmaq | 25 mmaq | 50 mmaq | 100 mmaq |
|---|---|---|---|---|---|---|---|
| Blurring of discharged line | C | C | A | A | A | A | A |

As seen in the results shown in Table 7, although color mixing occurred for cleaning while maintaining the normal adjusted pressure of from −25 to −10 mmaq, color mixing was avoided when the adjusted pressure was changed to 0 mmaq. This means that if the pressure applied to the liquid fabrication in a head during cleaning is adjusted to the side of a positive pressure, the cleaning liquid is prevented from being drawn into a nozzle, thereby avoiding color mixing. Color mixing was found not to occur in the range of an adjusted pressure of from 0 to 25 mmaq in which a liquid fabrication did not come out from a nozzle.

Liquid droplets of a liquid fabrication come out from a nozzle (purged state) at an adjusted pressure surpassing 25 mmaq. Therefore, liquid droplets of the liquid fabrication remain at the surface of a nozzle after cleaning. These liquid droplets remaining on the surface are required to be removed by maintenance such as wiping. If a liquid fabrication is likely to fixate, the liquid fabrication may remain and adhere to the surface of a nozzle after wiping the surface.

On the other hand, a liquid fabrication does not come out at an adjusted pressure of from 0 to 25 mmaq so that what remains on the surface of a nozzle is the cleaning liquid alone after cleaning the surface. The liquid fabrication is thus unlikely to fixate to the surface of a nozzle in comparison with an adjusted pressure of greater than 25 mmaq. Alternatively, as described later, the cleaning liquid does not remain on the surface of a nozzle depending on the conditions of cleaning. This obviates the need for maintenance such as wiping, thereby eliminating the concern about the degradation of a repellent film at the surface of a nozzle by wiping.

Evaluation on Removability of Powder, Remaining of Cleaning Liquid, and Color Mixing The surface of a nozzle at which powder adhered to was cleaned with a cleaning liquid. The surface of a nozzle was subjected to shooting with a camera before and after the cleaning. The images obtained were compared to evaluate the removability of powder, remaining of cleaning liquid, and color mixing. The surface was cleaned using the mechanism for spraying a cleaning liquid to the surface of a nozzle illustrated in FIG. 9 while changing the moving speed of the mechanism as shown in Table 8 and the adjusted pressure to −25 mmaq or +25 mmaq. Thereafter, the results were evaluated. Triethylene glycol dimethyl ether as a cleaning liquid, the liquid fabrication of Example 2, and powdered aluminum (ALSI-3-30B, manufactured by Toyo Aluminium K.K.) were used for the cleaning. The liquid fabrication of Example 2 was discharged to a transparent sheet (VF-1420N, manufactured by KOKUYO CO., LTD.) and then powdered aluminum (ALSI3-30B, manufactured by Toyo Aluminium K.K.) was sprinkled to the sheet, followed by printing the patterns as illustrated in FIGS. 8A to 8C. The degree of blurring (color mixing) of the discharged lines were evaluated according to the following criteria.

Figure 10A:
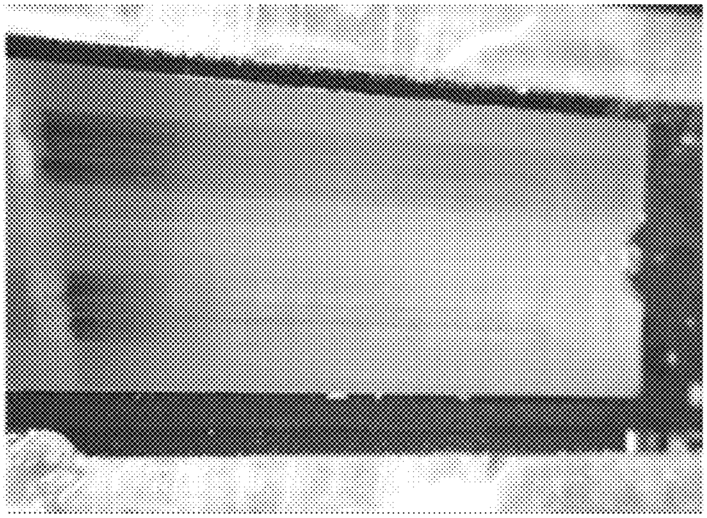
FIG. 10A is a photo of the state of the cleaned surface of a nozzle.
Figure 10B:
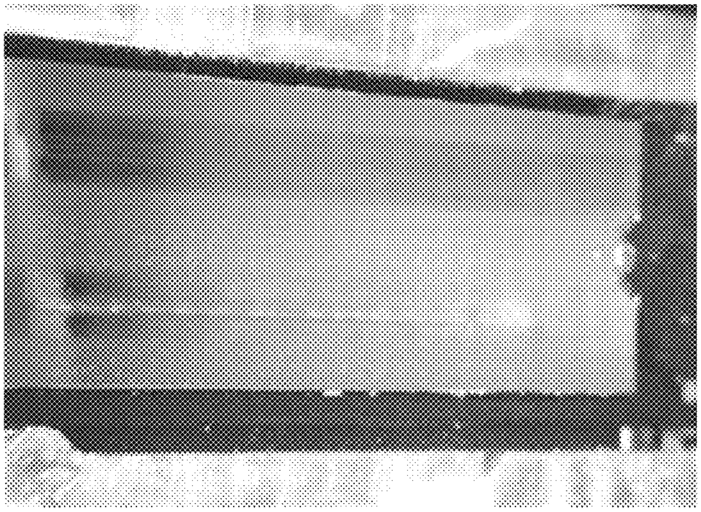
FIG. 10B is a photo of the state of the surface of a nozzle to which powder adheres.
Figure 10C:
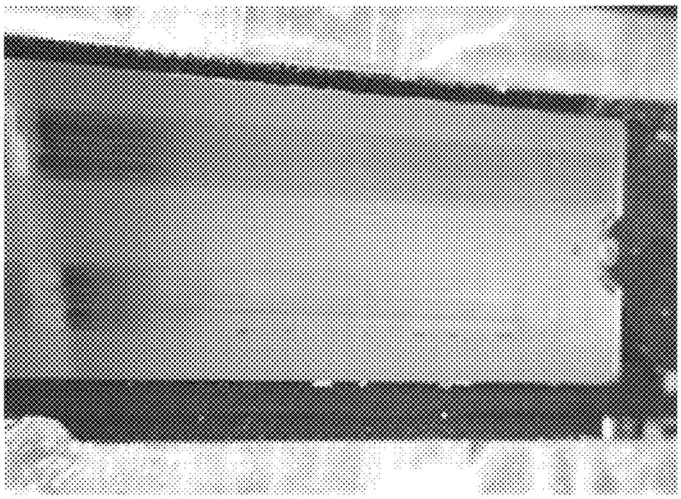
FIG. 10C is a photo of the state of the surface of a nozzle after the surface is cleaned with a cleaning liquid at a moving speed of 10 mm/s.
Figure 10D:
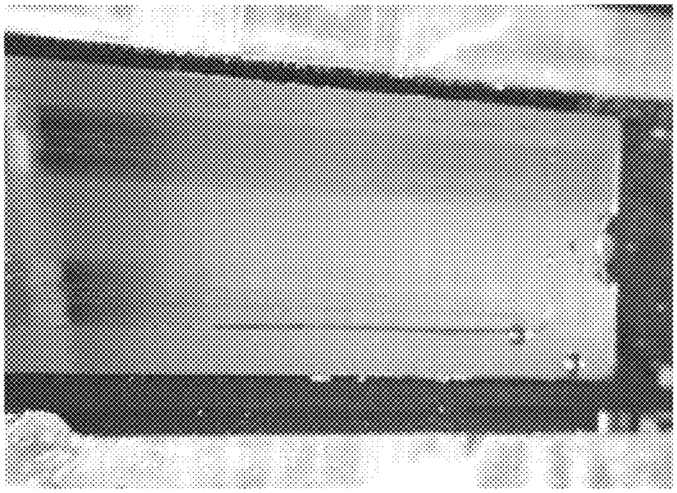
FIG. 10D is a photo of the state of the surface of a nozzle after the surface is cleaned with a cleaning liquid at a moving speed of 30 mm/s.
Figure 10E:
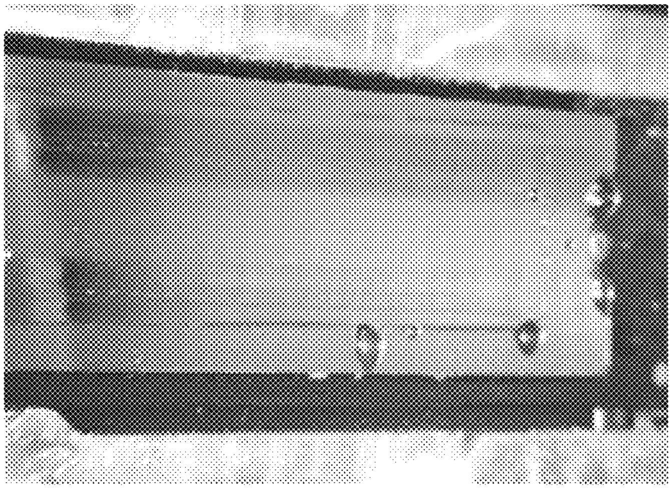
FIG. 10E is a photo of the state of the surface of a nozzle after the surface is cleaned with a cleaning liquid at a moving speed of 50 mm/s.

The results are shown in Table 8. FIG. 10A is a photo of the state of the cleaned surface of a nozzle. FIG. 10B is a photo of the state of the surface of a nozzle to which powder adheres. FIG. 10C is a photo of the state of the surface of a nozzle after the surface is cleaned with a cleaning liquid at a moving speed of 10 mm/s. FIG. 10D is a photo of the state of the surface of a nozzle after the surface is cleaned with a cleaning liquid at a moving speed of 30 mm/s. FIG. 10E is a photo of the state of the surface of a nozzle after the surface is cleaned with a cleaning liquid at a moving speed of 50 mm/s.

Evaluation Criteria i) Regarding removability of powder, graded as A when 90 percent or more of the powder adhering to the surface of a nozzle is removed and graded as C when less than 90 percent or more of the powder adhering to the surface of a nozzle is removed.

ii) Regarding remaining of cleaning liquid, graded as A when cleaning liquid does not remain at the surface of a nozzle after cleaning, graded as B when cleaning liquid slightly remains at the surface of a nozzle after cleaning, and graded as C when cleaning liquid significantly remains at the surface of a nozzle after cleaning.

iii) The surface of a nozzle was cleaned with a cleaning liquid while the adjusted pressure was the same as the normal condition of −25 mmaq. The results obtained by determining the color mixing as in FIGS. 8A to 8C are shown in Table 8. Graded as B if color mixing occurs as in FIG. 8B, graded as C if color mixing occurs as in FIG. 8C, and graded as A if color mixing occurs as in FIG. 8A.

iv) The pressure was adjusted to +25 mmaq during cleaning and the color mixing was evaluated as in iii).

TABLE 8

| Moving speed of mechanism for spraying cleaning liquid | 5 mm/s | 10 mm/s | 20 mm/s | 30 mm/s | 50 mm/s |
|---|---|---|---|---|---|
| i) Rmovability of powder | A | A | A | C | C |
| ii) Remaining of cleaning liquid | A | A | B | C | C |
| iii) Color mixing at cleaning at adjusted pressure of −25 mmaq | C | C | C | C | B |
| iv) Color mixing at cleaning at adjusted pressure of +25 mmaq | B | A | A | A | A |

As seen in the results shown in Table 8, the moving speed is found to be 20 mm/s or less to remove the powder adhering to the surface of a nozzle.

Regarding color mixing, as the moving speed decreases, the time of the cleaning liquid in contact with the surface of a nozzle increases, which increases the risk of color mixing. For cleaning at an adjusted pressure of −25 mmaq, as the moving speed decreases, the degree of color mixing was likely to become worse. Conversely, for cleaning at an adjusted pressure of +25 mmaq, color mixing was confirmed to be little. However, color mixing still slightly remained at a moving speed of 5 mm/s under an adjusted pressure of +25 mmaq.

Therefore, in order to remove powder adhering to the surface of a nozzle and avoid color mixing during cleaning, the moving speed of a mechanism for spraying cleaning liquid is preferably from 10 to 20 mm/s. For the mechanism for spraying a cleaning liquid in the present test, the cleaning liquid was found to be applied to a point of the surface of a nozzle for 1 to 2 seconds because the length of the cleaning liquid in contact with the surface of a nozzle was 20 mm (FIG. 9).

Moreover, whether the liquid droplet of a liquid fabrication or a cleaning liquid remained on the surface of a nozzle after the cleaning was evaluated, the liquid droplet was found not to remain at 10 mm/s or less. If the liquid droplet remains on the surface of a nozzle, it is removed by wiping. However, a moving speed of 10 mm/s obviated the need for this wiping. If wiping can be omitted, the time taken for wiping is saved and the wiping film is inhibited from deteriorating attributable to the wiping.

In addition, color mixing is canceled (discharged line does not blur) by ejecting the liquid fabrication present in a nozzle after cleaning even when color mixing slightly remains as in the case of a moving speed of 5 mm/s.

Aspects of the present disclosure are, for example, as follows.

1. A liquid fabrication applied to a layer of powder containing an inorganic particle, wherein the liquid fabrication has a powder contact angle with the inorganic particle of 50 degrees or greater and satisfies the following relationship 1: $\gamma\cos\theta/\eta \leq 1.5$ m/s.

In the relationship 1, θ represents the powder contact angle, γ represents a surface tension in mN/m of the liquid fabrication at 23° C., and η represents a viscosity in mPa·s of the liquid fabrication at 25° C.

2. A liquid fabrication applied to a layer of powder containing an inorganic particle, wherein the liquid fabrication has a powder contact angle with an aluminum particle of 50 degrees or greater and satisfies the following relationship 1: $\gamma\cos\theta/\eta \leq 1.5$ m/s, In the relationship 1, θ represents the powder contact angle of the liquid fabrication with the aluminum particle, γ represents the surface tension in mN/m of the liquid fabrication at 23° C., and η represents the viscosity in mPa·s of the liquid fabrication at 25 degrees C.

3. The liquid fabrication according to 1 or 2 mentioned above, wherein the powder contact angle is from 50 to 80 degrees.

4. The liquid fabrication according to any one of 1 to 3 mentioned above, wherein the liquid fabrication satisfies the following relationship 2: $\gamma\cos\theta/\eta \leq 1$ m/s.

5. The liquid fabrication according to any one of 1 to 4 mentioned above, wherein η is 6 mPa·s or greater at 25° C.

6. The liquid fabrication according to any one of 1 to 5 mentioned above, wherein η is 12 mPa·s or greater 25° C.

7. The liquid fabrication according to any one of 1 to 6 mentioned above has a surface tension γ of 22 mN/m or greater.

8. The liquid fabrication according to any one of 1 to 7 mentioned above, wherein the amount of the liquid fabrication applied to the layer of powder is from 0.033 to 0.33 $\mu L/mm^3$.

9. The liquid fabrication according to 8 mentioned above, wherein the amount of the liquid fabrication applied to the layer of powder is from 0.148 to 0.33 $\mu L/mm^3$.

10. The liquid fabrication according to any one of 1 to 9 mentioned above, wherein the liquid fabrication is applied at a resolution of 600 dpi or greater.

11. The liquid fabrication according to any one of 1 to 10 mentioned above, wherein the pressure applied to a nozzle for discharging the liquid fabrication is adjusted to be from 0 to 25 mmaq while a cleaning liquid for cleaning the surface of the nozzle is applied to the surface.

12. The liquid fabrication according to η mentioned above, wherein the time taken to apply the cleaning liquid to the surface is from 1 to 2 seconds.

13. A liquid fabrication contains an organic solvent, a surfactant, and a resin having a structural unit represented by the following Chemical Formula 1, wherein the liquid fabrication is applied to a layer of powder containing inorganic particles.

Chemical Formula 1

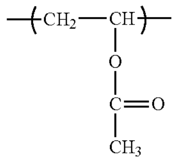

14. The liquid fabrication according to 13 mentioned above, wherein the surfactant contains at least one of a fluorochemical surfactant and a silicone surfactant.

15. The liquid fabrication according to 13 or 14 mentioned above, wherein the proportion of the surfactant is from 0.001 to 1 percent by mass to the entire of the liquid fabrication.

16. The liquid fabrication according to any one of 13 to 15 mentioned above, wherein the resin having a structural unit represented by Chemical Formula 1 contains at least one of a polyvinyl acetate resin, partially saponified polyvinyl acetate resin, and polyvinyl butyral resin.

17. The liquid fabrication according to any one of 13 to 16 mentioned above, wherein the proportion of the resin having a structural unit represented by Chemical Formula 1 is from 5 to 20 percent by mass to the entire of the liquid fabrication.

18. The liquid fabrication according to any one of 13 to 17 mentioned above, wherein the organic solvent has at least one structure selected from an alkoxy group, an ether bond, and an ester bond.

19. The liquid fabrication according to 18 mentioned above, wherein the organic solvent contains an alkylene glycol dialkyl ether compound.

20. The liquid fabrication according to any one of 13 to 19 mentioned above, wherein the liquid fabrication is substantially free of water.

21. The liquid fabrication according to any one of 13 to 20 mentioned above, wherein the liquid fabrication has a powder contact angle with the inorganic particle of 50 degrees or greater and satisfies the following relationship 1: $\gamma\cos\theta/\eta \leq 1.5$ m/s.

In the relationship 1, $\theta$ represents the powder contact angle, $\gamma$ represents a surface tension in mN/m of the liquid fabrication at 23° C., and $\eta$ represents a viscosity in mPa·s of the liquid fabrication at 25° C.

22. A fabrication kit contains the liquid fabrication of any one of 1 to 21 mentioned above and an inorganic particle.

23. The fabrication kit according to 22 mentioned above, wherein the inorganic particle is a metal particle and the metal particle contains at least one of aluminum, zinc, magnesium, and an alloy thereof.

24. The fabrication kit according to 20 or 21 mentioned above, wherein the inorganic particle is not covered with a resin.

25. A method of manufacturing a fabrication object includes forming a layer of powder containing an inorganic particle, applying the liquid fabrication of any one of 1 to 21 mentioned above to the layer, and sequentially repeating the forming and the applying to form a laminate.

26. The method of manufacturing a fabrication object according to 25 mentioned above, wherein the applying includes discharging the liquid fabrication to the layer of powder by inkjetting.

27. The method of manufacturing a fabrication object according to 25 or 26 mentioned above further includes heating the laminate to form solidified matter and removing extra power adhering to the solidified matter to obtain a green object.

28. The method of manufacturing a fabrication object according to 27 mentioned above further includes heating the green object to form a degreased object from which resin if removed and heating the degreased object to form a sintered compact.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A method of manufacturing a fabrication object, comprising:

forming a layer of powder containing an inorganic particle;

applying a liquid fabrication to the layer; and sequentially repeating the forming and the applying to form a laminate, wherein the liquid fabrication has a powder contact angle with the inorganic particle of 50 degrees or greater and satisfies the following relationship 1: $\gamma\cos\theta/\eta \leq 1.5$ m/s, where $\theta$ represents the powder contact angle, $\gamma$ represents a surface tension in mN/m of the liquid fabrication at 23° C., and n represents a viscosity in mPa·s of the liquid fabrication at 25° C.;

wherein the liquid fabrication comprises:

an organic solvent:

a surfactant; and a resin binder having a structural unit represented by the following Chemical Formula 1, wherein the liquid fabrication is applied to the layer of powder containing inorganic particles Chemical Formula 1

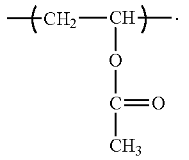

2. The method of manufacturing according to claim 1, wherein the inorganic particle is an aluminum particle.

3. The method of manufacturing according to claim 1, wherein the powder contact angle is from 50 to 80 degrees.

4. The method of manufacturing according to claim 1, wherein the liquid fabrication satisfies the following relationship 2: $\gamma\cos\theta/\eta \leq 1$ m/s.

5. The method of manufacturing according to claim 1, wherein $\eta$ is 6 mPa·s or greater at 25° C.

6. The method of manufacturing according to claim 1, wherein an amount of the liquid fabrication applied to the layer of powder is from 0.033 to 0.33 $\mu L/mm^3$.

7. The method of manufacturing according to claim 1, wherein the liquid fabrication is discharged at a resolution of 600 dpi or greater.

8. The method of manufacturing according to claim 1, wherein a pressure applied to a nozzle for discharging the liquid fabrication is adjusted to be from 0 to 25 mmaq while a cleaning liquid is applied to a surface of the nozzle.

9. The method of manufacturing according to claim 8, wherein a time taken to apply the cleaning liquid to the surface is from 1 to 2 seconds.

10. A method of manufacturing a fabrication object, comprising:

forming a layer of powder containing an inorganic particle;

applying a liquid fabrication to the layer; and sequentially repeating the forming and the applying to form a laminate, wherein the liquid fabrication comprising:

an organic solvent;

a surfactant; and a resin binder having a structural unit represented by the following Chemical Formula 1, wherein the liquid fabrication is applied to the layer of powder containing inorganic particles,

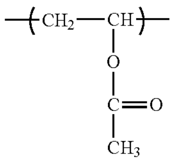

11. The method of manufacturing according to claim 10, wherein the surfactant comprises at least one of a fluorochemical surfactant or a silicone surfactant.

12. The method of manufacturing according to claim 10, wherein a proportion of the surfactant is from 0.001 to 1 percent by mass to an entire of the liquid fabrication.

13. The method of manufacturing according to claim 10, wherein the resin binder comprises at least one of a polyvinyl acetate resin, partially saponified polyvinyl acetate resin, or polyvinyl butyral resin.

14. The method of manufacturing according to claim 10, wherein a proportion of the resin binder is from 5 to 20 percent by mass to an entire of the liquid fabrication.

15. The method of manufacturing according to claim 10, wherein the organic solvent has at least one structure selected from the group consisting of an alkoxy group, an ether bond, and an ester bond.

16. The method of manufacturing according to claim 15, wherein the organic solvent comprises an alkylene glycol dialkyl ether compound.

17. The method of manufacturing according to claim 10, wherein the liquid fabrication is substantially free of water.

* * * * *